United States Patent
Xue et al.

(10) Patent No.: US 12,243,311 B2
(45) Date of Patent: Mar. 4, 2025

(54) METHODS AND SYSTEMS FOR VEHICLE VERIFICATION

(71) Applicant: BEIJING DIDI INFINITY TECHNOLOGY AND DEVELOPMENT CO., LTD., Beijing (CN)

(72) Inventors: Taolue Xue, Beijing (CN); Tianming Zhang, Beijing (CN); Zhiheng Wang, Beijing (CN); Shudong Wang, Beijing (CN); Jie Li, Beijing (CN); Hui Meng, Beijing (CN); Tianyu Chen, Hangzhou (CN); Guiting Dai, Hangzhou (CN); Zhaohui Wu, Hangzhou (CN); Duoqing Zhou, Hangzhou (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 358 days.

(21) Appl. No.: 17/808,532

(22) Filed: Jun. 23, 2022

(65) Prior Publication Data
US 2022/0335722 A1    Oct. 20, 2022

Related U.S. Application Data

(63) Continuation of application No. PCT/CN2020/138862, filed on Dec. 24, 2020.

(30) Foreign Application Priority Data

Dec. 24, 2019  (CN) .......................... 201911349534.4

(51) Int. Cl.
*G06K 9/00* (2022.01)
*G06V 10/82* (2022.01)
*G06V 20/50* (2022.01)

(52) U.S. Cl.
CPC .............. *G06V 20/50* (2022.01); *G06V 10/82* (2022.01); *G06V 2201/08* (2022.01)

(58) Field of Classification Search
CPC ..... G06V 20/50; G06V 10/82; G06V 2201/08
See application file for complete search history.

(56) References Cited

U.S. PATENT DOCUMENTS

| 10,061,322 B1 * | 8/2018 | Palefsky-Smith ... G06V 10/764 |
| 2017/0228410 A1 | 8/2017 | Slusar |

(Continued)

FOREIGN PATENT DOCUMENTS

| CN | 104539891 A | 4/2015 |
| CN | 104573693 A | 4/2015 |

(Continued)

OTHER PUBLICATIONS

Robust Image Processing for an Omnidirectional Camera-based Smart Car Door, Christian Scharfenberger et al., ACM, 2012, pp. 87.: 1 to 87:28 (Year: 2012).*

(Continued)

*Primary Examiner* — Jayesh A Patel
(74) *Attorney, Agent, or Firm* — METIS IP LLC

(57) ABSTRACT

The present disclosure provides methods and systems for vehicle verification. The method may include receiving vehicle verification information related to a vehicle to be verified from a client, wherein the vehicle verification information includes a plurality of images acquired by the client via an imaging device, and the vehicle verification information responds to at least one vehicle verification instruction. The method may further include determining a verification result of the vehicle based on the vehicle verification information.

20 Claims, 15 Drawing Sheets

(56) References Cited

U.S. PATENT DOCUMENTS

| | | | |
|---|---|---|---|
| 2019/0012808 A1 | 1/2019 | Mou | |
| 2019/0092281 A1 | 3/2019 | Okada et al. | |
| 2019/0092318 A1* | 3/2019 | Mei | G06N 3/04 |
| 2019/0114924 A1 | 4/2019 | Bergquist et al. | |
| 2019/0122052 A1* | 4/2019 | Miyake | G06V 20/52 |
| 2019/0279044 A1* | 9/2019 | Vasisht | G06V 10/17 |
| 2019/0354786 A1* | 11/2019 | Lee | G06N 3/084 |
| 2020/0223431 A1* | 7/2020 | Zass | B60W 30/09 |
| 2020/0231160 A1* | 7/2020 | Zass | B60W 30/18163 |

FOREIGN PATENT DOCUMENTS

| | | | |
|---|---|---|---|
| CN | 105827614 A | | 8/2016 |
| CN | 106485916 A | | 3/2017 |
| CN | 107066983 A | | 8/2017 |
| CN | 107784739 A | | 3/2018 |
| CN | 107818389 A | | 3/2018 |
| CN | 107972626 A | | 5/2018 |
| CN | 108090747 A | | 5/2018 |
| CN | 108460847 A | | 8/2018 |
| CN | 108508862 A | | 9/2018 |
| CN | 108764293 A | | 11/2018 |
| CN | 109190488 A | * | 1/2019 ......... G06K 9/00825 |
| CN | 109447003 A | | 3/2019 |
| CN | 109556879 A | | 4/2019 |
| CN | 109784170 A | | 5/2019 |
| CN | 109816815 A | | 5/2019 |
| CN | 109858339 A | | 6/2019 |
| CN | 109886080 A | | 6/2019 |
| CN | 109978087 A | | 7/2019 |
| CN | 110175748 A | | 8/2019 |
| CN | 110287810 A | | 9/2019 |
| CN | 110287816 A | | 9/2019 |
| CN | 111060507 A | | 4/2020 |
| DE | 102018120655 A1 | | 2/2019 |
| JP | 2002319091 A | * | 10/2002 ............. G01S 11/12 |
| KR | 101394201 B1 | | 5/2014 |
| RU | 2674330 C2 | | 12/2018 |
| WO | 2016145547 A1 | | 9/2016 |

OTHER PUBLICATIONS

A Novel Vehicle Open Door Safety System Based on Cyclist Detection Using Fisheye Camera and Improved Deep Convolutional Generative Adversarial Nets, Miankuan Zhu et al., IEEE, 2019, pp. 2195-2201 (Year: 2019).*

Passenger Compartment Violation Detection in HOV/HOT Lanes, Yusuf Artan et al., IEEE, 2016, pp. 395-405 (Year: 2016).*

Looking-In and Looking-Out of a Vehicle: Computer-Vision-Based Enhanced Vehicle Safety, Mohan Manubhai Trivedi et al., IEEE, 2007, pp. 108-120 (Year: 2007).*

Real-Time Vehicle Tracking System, Dr. A.K.M Abdul Malek Azad, BRAC University Thesis, 2015, pp. 1-95 (Year: 2015).*

International Search Report in PCT/CN2020/138862 mailed on Mar. 22, 2021, 8 pages.

Written Opinion in PCT/CN2020/138862 mailed on Mar. 22, 2021, 12 pages.

First Office Action in Chinese Application No. 201911349534.4 mailed on Jun. 30, 2020, 23 pages.

The Third Office Action in Chinese Application No. 201911349534.4 mailed on Dec. 30, 2020, 18 pages.

The Second Office Action in Chinese Application No. 202110358068.7 mailed on Apr. 26, 2024, 28 pages.

Wang, Zhengqin et al., Study on the Tracking Algorithm of Self-adaptive Vehicle Based on Virtual Grid Technology, Journal of Jilin Teachers Institute of Engineering and Technology, 29(5): 70-76, 2013.

Yu, Xiaochuan, On Design and Application of Remote Automobiles Auditing and Monitoring Management System, Journal of Guangxi Police Academy, 25(6): 43-47, 2012.

Gao, Lei et al., Video Vehicle Detection Algorithm Based on Edge Symmetry, Journal of Beijing University of Aeronautics and Astronautics, 34(9): 1113-1116, 2008.

Ge, Yanxia, Research Application of the Automatic Test Device for Metro Cars, Computer Measurement & Control, 23(4): 1253-1255, 2015.

* cited by examiner

400

METHODS AND SYSTEMS FOR VEHICLE VERIFICATION

CROSS-REFERENCE TO RELATED APPLICATIONS

This application is a Continuation of International Application No. PCT/CN2020/138862 filed on Dec. 24, 2020, which claims priority of Chinese Patent Application No. 201911349534.4 filed on Dec. 24, 2019, the contents of which are hereby incorporated by reference.

TECHNICAL FIELD

The present disclosure relates to the field of computer technology, and in particular, to methods and systems for vehicle verification.

BACKGROUND

With the rapid development of Internet technology, services that can be provided through the Internet technology are becoming more and more diverse. In some scenarios, it is necessary to perform identity information verification or asset information verification on registration information or application information submitted by users. For example, when a user submits registration information or application information related to a vehicle, authenticity of the vehicle needs to be verified. If the authenticity of the vehicle is verified manually, it may be time-consuming and laborious, and the verification efficiency may be low. Therefore, it is desirable to provide methods and systems for vehicle verification to achieve efficient and accurate automatic verification.

SUMMARY

An aspect of some embodiments of the present disclosure provides a method implemented on a computing device. The computing device may include at least one processor and at least one storage medium. The at least one storage medium may include a set of instructions for vehicle verification. The method may include receiving vehicle verification information related to a vehicle to be verified from a client, wherein the vehicle verification information includes a plurality of images acquired by the client via an imaging device, and the vehicle verification information responds to at least one vehicle verification instruction; and determining a verification result of the vehicle based on the vehicle verification information.

Another aspect of some embodiments of the present disclosure provides a system. The system may include at least one storage medium including a set of instructions for vehicle verification; and at least one processor in communication with the at least one storage medium, wherein executing the set of instructions, the at least one processor is directed to perform operations. The operations may include receiving vehicle verification information related to a vehicle to be verified from a client, wherein the vehicle verification information includes a plurality of images acquired by the client via an imaging device, and the vehicle verification information is configured to respond to at least one vehicle verification instruction; and determining a verification result of the vehicle based on the vehicle verification information.

An aspect of some embodiments of the present disclosure provides a vehicle verification system. The system may include a receiving module and a verification module. The receiving module may be configured to receive vehicle verification information related to a vehicle to be verified from a client, wherein the vehicle verification information includes a plurality of images acquired by the client via an imaging device, and the vehicle verification information responds to at least one vehicle verification instruction. The verification module may be configured to determine a verification result of the vehicle based on the vehicle verification information.

One aspect of some embodiments of the present disclosure provides a computer-readable storage medium comprising computer instructions that, when executed by at least one processor, direct the at least one processor to perform a method. The method may include receiving vehicle verification information related to a vehicle to be verified from a client, wherein the vehicle verification information includes a plurality of images acquired by the client via an imaging device, and the vehicle verification information is configured to respond to at least one vehicle verification instruction; and determining a verification result of the vehicle based on the vehicle verification information.

An aspect of some embodiments of the present disclosure provides a method implemented on a computing device. The computing device may include at least one processor and at least one storage medium. The at least one storage medium may include a set of instructions for vehicle verification. The method may include receiving at least one vehicle verification instruction; sending at least one verification action prompt to a user based on the at least one vehicle verification instruction; in response to the at least one verification action prompt, obtaining vehicle verification information related to a vehicle to be verified, wherein the vehicle verification information includes a plurality of images acquired by a client via an imaging device; and transmitting the vehicle verification information to a server, causing the server to determine a verification result of the vehicle based on the vehicle verification information.

Another aspect of some embodiments of the present disclosure provides a system. The system may include at least one storage medium including a set of instructions for vehicle verification; and at least one processor in communication with the at least one storage medium, wherein executing the set of instructions, the at least one processor is directed to perform operations. The operations may include receiving at least one vehicle verification instruction; sending at least one verification action prompt to a user based on the at least one vehicle verification instruction; in response to the at least one verification action prompt, obtaining vehicle verification information related to a vehicle to be verified, wherein the vehicle verification information includes a plurality of images acquired by a client via an imaging device; and transmitting the vehicle verification information to a server, causing the server to determine a verification result of the vehicle based on the vehicle verification information.

An aspect of some embodiments of the present disclosure provides a vehicle verification system. The system may include a receiving module, a prompt module, an obtaining module, and a transmission module. The receiving module may be configured to receive at least one vehicle verification instruction from a server. The prompt module may be configured to send one or more verification action prompts to a user based on the vehicle verification instruction. The obtaining module may be configured to obtain verification image information in response to the one or more verification action prompts; wherein the verification image information is obtained via an imaging device. The transmission module may be configured to transmit the vehicle verification information to the server based on the verification image information, causing the server to determine a verification result of the vehicle based on the vehicle verification information.

One aspect of some embodiments of the present disclosure provides a computer-readable storage medium comprising computer instructions that, when executed by at least one processor, direct the at least one processor to perform a method. The method may include receiving at least one vehicle verification instruction; sending at least one verification action prompt to a user based on the at least one vehicle verification instruction; in response to the at least one verification action prompt, obtaining vehicle verification information related to a vehicle to be verified, wherein the vehicle verification information includes a plurality of images acquired by a client via an imaging device; and transmitting the vehicle verification information to a server, causing the server to determine a verification result of the vehicle based on the vehicle verification information.

DETAILED DESCRIPTION

In order to describe technical solutions of the embodiments of the present disclosure more clearly, the following description may briefly introduce the accompanying drawings that need to be used in some embodiments of the present disclosure. Obviously, the accompanying drawings in the following description are only examples or embodiments of the present disclosure. For those skilled in the art, the present disclosure may be applied to other similar scenarios based on the accompanying drawings without creative effort. Same symbols in the figures may represent same structures or operations unless the context clearly indicates otherwise.

It will be understood that the term "system," "engine," "unit," and/or "module" used herein are one method to distinguish different components, elements, parts, sections, or assembly of different levels in ascending order. However, the terms may be displaced by another expression if they achieve the same purpose.

As used herein, the singular forms "a," "an," and "the" may be intended to include the plural forms as well, unless the context clearly indicates otherwise. It will be further understood that the terms "comprise," "comprises," and/or "comprising," "include," "includes," and/or "including" when used in this disclosure, specify the presence of stated operations and/or elements, but do not preclude the presence or addition of one or more other operations and/or elements thereof.

The flowcharts used in the present disclosure illustrate operations that systems implement according to some embodiments in the present disclosure. It is to be expressly understood, the operations of the flowchart may be implemented not in order. Conversely, the operations may be implemented in an inverted order, or simultaneously. Moreover, one or more other operations may be added to the flowcharts. One or more operations may be removed from the flowcharts.

In the present disclosure, data may refer to a digital representation of information, and may include various types, such as binary data, text data, image data, video data, etc. Instructions may refer to programs that can be used to control equipment or devices to perform specific functions.

Figure 1:
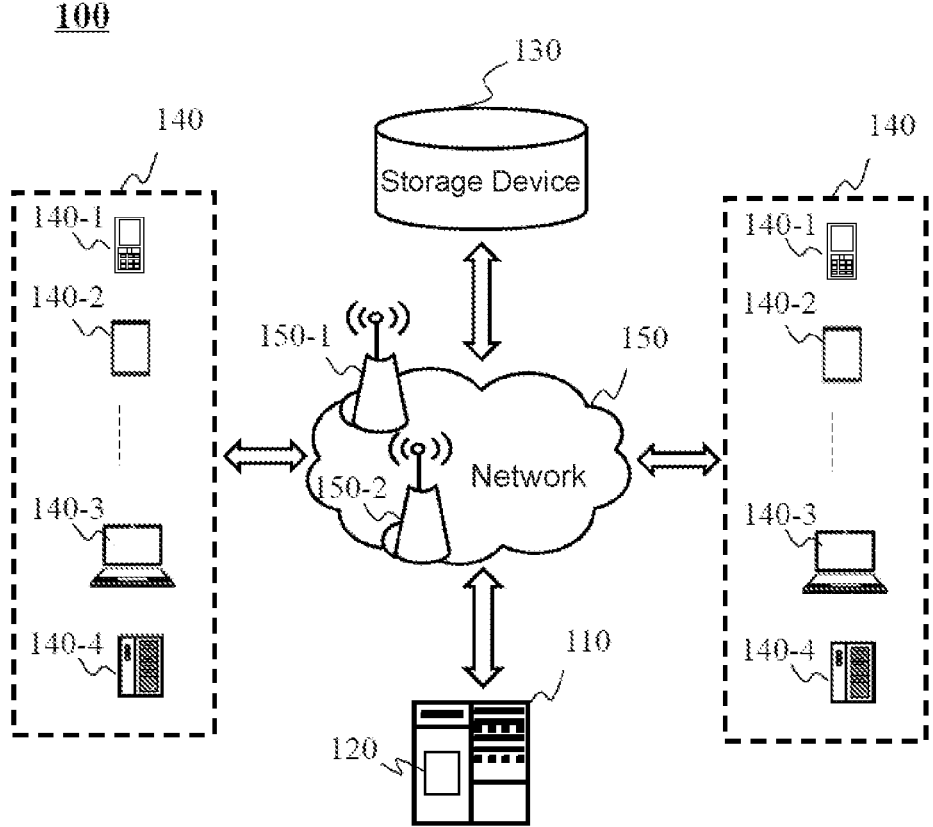
FIG. 1 is a schematic diagram illustrating an exemplary vehicle verification system according to some embodiments of the present disclosure.

FIG. 1 is a schematic diagram illustrating an exemplary vehicle verification system according to some embodiments of the present disclosure. In some embodiments, the vehicle verification system 100 may be applied to various scenarios, such as transportation services, traffic services, etc. For example, the vehicle verification system 100 may be applied to an online service platform that provides transportation services or traffic services (e.g., an express car service, a special car service, a carpooling service, a taxis service, a driver hire service, a driver sale service).

In some embodiments, as shown in FIG. 1, the vehicle verification system 100 may include a server 110, a processor 120, a storage device 130, a user terminal 140, and a network 150.

In some application scenarios, the vehicle verification system 100 may be used for vehicle verification. The vehicle verification system 100 may verify whether a vehicle corresponding to obtained vehicle verification information (e.g., vehicle verification information uploaded by a user) is a real vehicle by implementing the methods and/or processes disclosed in the present disclosure.

In some application scenarios, a user who uses the user terminal 140 may include an online car-hailing driver, a taxi driver, a private vehicle owner, etc.

In some embodiments, the user terminal 140 may obtain the vehicle verification information related to a vehicle to be verified, and transmit the vehicle verification information to the server 110. The server 110 may process the vehicle verification information and determine a verification result of the vehicle. The user terminal 140 may receive the verification result from the server 110 and display the verification result to the user. During the process, the server 110 may obtain data from the storage device 130 or save data to the storage device 130. Alternatively, the server 110 may also read data from other sources or output data to other devices through the network 150. In some embodiments, at least a portion of operations related to the vehicle verification process described above may be performed on different devices. For example, at least a portion of the operations related to the vehicle verification process may be performed on the user terminal 140. In some embodiments, the operations in the present disclosure may be performed by executing program instructions through the server 110 and/or the user terminal 140. The above processes are merely for convenience, and the system 100 may also implement the processes in the present disclosure by other feasible operational modes.

Figure 2:
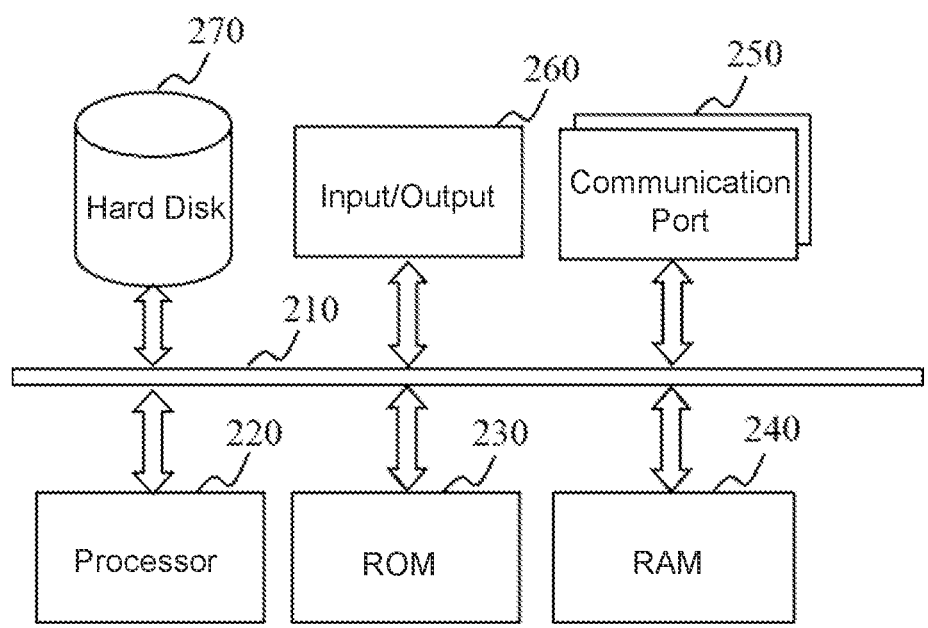
FIG. 2 is a schematic diagram illustrating exemplary hardware and/or software components of an exemplary computing device according to some embodiments of the present disclosure.

The server 110 may be configured to process data and/or information from at least one component of the vehicle verification system 100 or an external data source (e.g., a cloud data center). In some embodiments, the server 110 may be a single server or a server group. The server group may be centralized or distributed. For example, the server 110 may be a distributed system. In some embodiments, the server 110 may be local or remote. In some embodiments, the server 110 may be implemented on a cloud platform or provided in a virtual manner. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 including one or more components as shown in FIG. 2.

In some embodiments, the server 110 may include a processor 120. The processor 120 may process data and/or information obtained from other devices or components of the system 100. The processor 120 may perform program instructions based on the data, information, and/or processing results to perform one or more functions described in the present disclosure. In some embodiments, the processor 120 may include one or more sub-processing devices (e.g., a single-core processing device or a multi-core processing device). For example, the processor 120 may include a central processing unit (CPU), an application specific integrated circuit (ASIC), an application specific instruction processor (ASIP), a graphics processor (GPU), a physical processor (PPU), a digital signal processor (DSP), a field programmable gate array (FPGA), a programmable logic device (PLD), a controller, a microcontroller unit, a reduced instruction set computer (RISC), a microprocessor, or the like, or any combination thereof. In some embodiments, the processor 120 may be integrated or included in one or more other components (e.g., the user terminal 140 or other possible components) of the vehicle verification system 100.

The storage device 130 may be configured to store data and/or instructions. The storage device 130 may include one or more storage components, and each storage component may be an independent device or a portion of other devices. In some embodiments, the storage device 130 may include a random access memory (RAM), a read-only memory (ROM), a mass memory, a removable memory, a volatile read-write memory, or the like, or any combination thereof. Exemplary mass memories may include a magnetic disk, an optical disk, a solid state disk, etc. In some embodiments, the storage device 130 may be implemented on a cloud platform. For example, the cloud platform may include a private cloud, a public cloud, a hybrid cloud, a community cloud, a distributed cloud, an inter-cloud, a multi-cloud, or the like, or any combination thereof. In some embodiments, the storage device 130 may be integrated or included in one or more other components (e.g., the server 110, the user terminal 140, or other possible components) of the vehicle verification system 100.

The user terminal 140 may refer to one or more terminal devices or software used by the user. In some embodiments, the user who uses the user terminal 140 may include a user who directly uses the service or other related users. In some embodiments, the user terminal 140 may include a mobile device 140-1, a tablet computer 140-2, a laptop computer 140-3, a desktop computer 140-4, other devices with input and/or output functions, or the like, or any combination thereof. The above examples are merely provided for illustrating the breadth of the range of the user terminal 140, and not intended to limit the scope of the present disclosure.

The network 150 may connect various components of the system 100 and/or connect the system 100 with external parts. The network 150 may enable communication between components of the system 100 and communication between the system 100 and external parts to facilitate exchange of information and/or data. In some embodiments, the network 150 may be any type of wired or wireless network, or combination thereof. For example, the network 150 may include a cable network, an optical fiber network, a telecommunication network, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, an intra-device bus, an intra-device wireline, a cable connection, or the like, or any combination thereof. In some embodiments, the network connection between various parts of the system 100 may adopt one or more of the above methods. In some embodiments, the network 150 may include various topological structures, such as a point-to-point structure, a shared structure, a centralized structure, or the like, or any combination thereof. In some embodiments, the network 150 may include one or more network access points. For example, the network 150 may include wired or wireless network access points such as base stations and/or internet exchange points 150-1, 150-2, ..., through which one or more components of the vehicle verification system 100 may be connected to the network 150 to exchange data and/or information.

FIG. 2 is a schematic diagram illustrating exemplary hardware and/or software components of an exemplary computing device according to some embodiments of the present disclosure.

In some embodiments, the server 110 and/or the user terminal 140 may be implemented on the computing device 200. For example, the functions of the processor 120 disclosed in the present disclosure may be implemented and executed on the computing device 200. As shown in FIG. 2, the computing device 200 may include a bus 210, a processor 220, a read-only memory (ROM) 230, a random-access memory (RAM) 240, a communication port 250, an input/output interface 260, and a hard disk 270.

The processor 220 may execute computing instructions (program codes) and perform the functions of the vehicle verification system 100 described in the present disclosure. The computing instructions may include programs, objects, components, data structures, procedures, modules, functions (e.g., specific functions described in the present disclosure), etc. For example, the processor 220 may process image data or text data acquired from any other components of the vehicle verification system 100. In some embodiments, the processor 220 may include a microcontroller, a microprocessor, a reduced instruction set computer (RISC), an application specific integrated circuit (ASIC), an application specific instruction set processor (ASIP), a central processing unit (CPU), a graphics processing unit (GPU), a physical processing unit (PPU), a microcontroller unit, a digital signal processor (DSP), a field programmable gate array (FPGA), an advanced RISC machine (ARM), a programmable logic device, any circuits and processors that can perform one or more functions, or the like, or any combination thereof. Merely for illustration, only one processor is illustrated in FIG. 2. It should be noted that the computing device 200 in the present disclosure may also include multiple processors.

Memories of the computing device 200 (e.g., the ROM 230, the RAM 240, the hard disk 270) may store data/information acquired from any other components of the vehicle verification system 100. Exemplary ROMs may include a mask ROM (MROM), a programmable ROM (PROM), an erasable programmable ROM (EPROM), an electrically erasable programmable ROM (EEPROM), a compact disk ROM (CD-ROM), a digital universal disk ROM, etc. Exemplary RAMs may include a dynamic RAM (DRAM), a double-rate synchronous dynamic RAM (DDR SDRAM), a static RAM (SRAM), a thyristor RAM (T-RAM), a zero capacitance (Z-RAM), etc.

The communication port 250 may be connected to a network to facilitate data communications. The connection may be a wired connection, a wireless connection, or a combination thereof. The wired connection may include a cable, an optical cable, a telephone line, or the like, or any combination thereof. The wireless connection may include Bluetooth, Wi-Fi, WiMAX, WLAN, ZigBee, mobile networks (e.g., 3G, 4G, 5G, etc.), or the like, or any combination thereof. In some embodiments, the communication port 250 may be a standardized port, such as RS232, RS485, etc. In some embodiments, the communication port 250 may be a specially designed port.

The input/output interface 260 may be configured to input or output signals, data, or information. In some embodiments, the input/output interface 260 may enable the user to communicate with the vehicle verification system 100. In some embodiments, the input/output interface 260 may include an input device and an output device. Exemplary input devices may include a keyboard, a mouse, a touch screen, a microphone, or the like, or any combination thereof. Exemplary output devices may include a display device, a speaker, a printer, a projector, or the like, or any combination thereof. Exemplary display devices may include a liquid crystal display (LCD), a light emitting diode (LED)-based display, a flat panel display, a curved display, a television device, a cathode ray tube (CRT), or the like, or any combination thereof.

Figure 3:
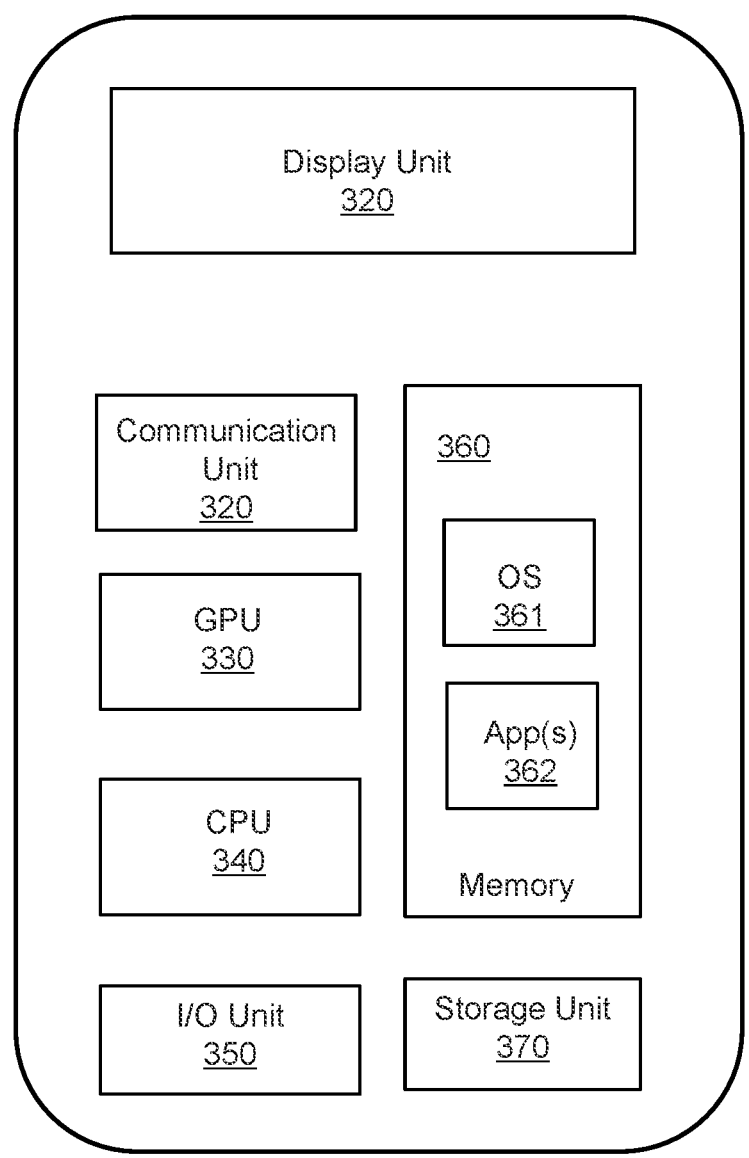
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device according to some embodiments of the present disclosure.

As shown in FIG. 3, the mobile device 300 may include a communication unit 310, a display unit 320, a graphics processing unit (GPU) 330, a central processing unit (CPU) 340, an input/output unit 350, a memory 360, a storage unit 370, etc. In some embodiments, an operating system 361 (e.g., iOS, Android, Windows Phone) and an application program 362 may be loaded into the memory 360 from the storage unit 370 in order to be executed by the CPU 340. The application program 362 may include a browser or an application program for receiving text, images, audio, or other related information from the vehicle verification system 100. User interactions with the information stream may be achieved via the input/output device 350 and provided to other components of the vehicle verification system 100 through the network.

To implement various modules, units, and their functionalities described in the present disclosure, the computing device or the mobile device may be used as the hardware platform(s) for one or more of the elements described herein. Hardware elements, operating systems, and programming languages of such computers are conventional in nature, and it is presumed that those skilled in the art are adequately familiar therewith to adapt those technologies to the system provided by real images described in the present disclosure. A computer with user interface elements may be used to implement a personal computer (PC) or other type of work station or terminal device, although a computer may also act as a server if appropriately programmed.

Figure 4:
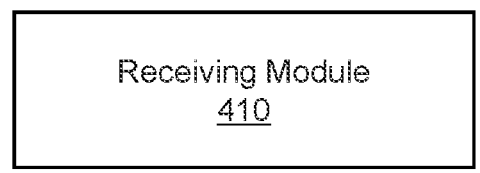
FIG. 4 is a block diagram illustrating an exemplary vehicle verification system according to some embodiments of the present disclosure.
Figure 4:
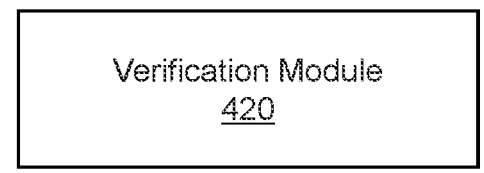

FIG. 4 is a block diagram illustrating an exemplary vehicle verification system according to some embodiments of the present disclosure. In some embodiments, the vehicle verification system 400 may be implemented on a server terminal (e.g., the server 110). In some embodiments, the vehicle verification system 400 may be integrated or partially integrated in the processing device 120.

As shown in FIG. 4, the vehicle verification system 400 may include a receiving module 410 and a verification module 420.

The receiving module 410 may receive vehicle verification information related to a vehicle to be verified from a client. As used herein, the vehicle verification information may include a plurality of images acquired by a client via an imaging device, and the vehicle verification information may respond to at least one vehicle verification instruction. More descriptions regarding the receiving the vehicle verification information related to the vehicle to be verified from the client may be found elsewhere in the present disclosure, for example, operation 510 in FIG. 5 and relevant descriptions thereof, which may not be repeated herein.

The verification module 420 may determine a verification result of the vehicle based on the vehicle verification information. In some embodiments, the verification module 420 may be further configured to determine, based on the plurality of images, a plurality of vehicle states corresponding to the plurality of images respectively; determine, based on the plurality of vehicle states, at least one vehicle action related to the vehicle; and determine the verification result of the vehicle based on the at least one vehicle action and the at least one vehicle verification instruction. More descriptions regarding the determining the verification result of the vehicle may be found elsewhere in the present disclosure, for example, operation 520 in FIG. 5 and relevant descriptions thereof, which may not be repeated herein.

It should be noted that the vehicle verification system 400 and its modules illustrated in FIG. 4 may be implemented via various ways. For example, in some embodiments, the vehicle verification system 400 and its modules may be implemented through hardware, software, or a combination thereof. Herein, the hardware may be implemented by a dedicated logic; the software may be stored in the storage, the vehicle verification system 400 may be executed by proper instructions, for example, by a microprocessor or a dedicated design hardware. Those skilled in the art can understand that, the methods and systems described in the present disclosure may be implemented by the executable instructions of a computer and/or by control code in the processor, for example, the code supplied in a carrier medium such as a disk, a CD, a DVD-ROM, in a programmable storage such as a read-only memory (firmware), or in a data carrier such as optical signal carrier or electric signal carrier. The system 400 and its modules in the present disclosure may be implemented by a hardware circuit in a programmable hardware device in a ultra large scale integrated circuit, a gate array chip, a semiconductor such as a transistor, a field programmable gate array, a programmable logic device, a software performed by various processors, or a combination thereof (e.g., firmware).

It should be noted that the above descriptions of the vehicle verification system 400 and its modules are merely provided for illustration, and not intended to limit the scope of the present disclosure. Apparently, for those skilled in the art, after understanding the principle of the vehicle verification system 400, it is possible to arbitrarily combine various modules, or form a subsystem to connect with other modules without departing from this principle. For example, the receiving module 410 and the verification module 420 disclosed in FIG. 4 may be different modules in a system, or one module that can realize the functions of the two modules. As another example, modules in the vehicle verification system 400 may share a storage module. Alternatively, each module may also include an own storage module. Such deformations do not depart from the scope of the present disclosure.

Figure 5:
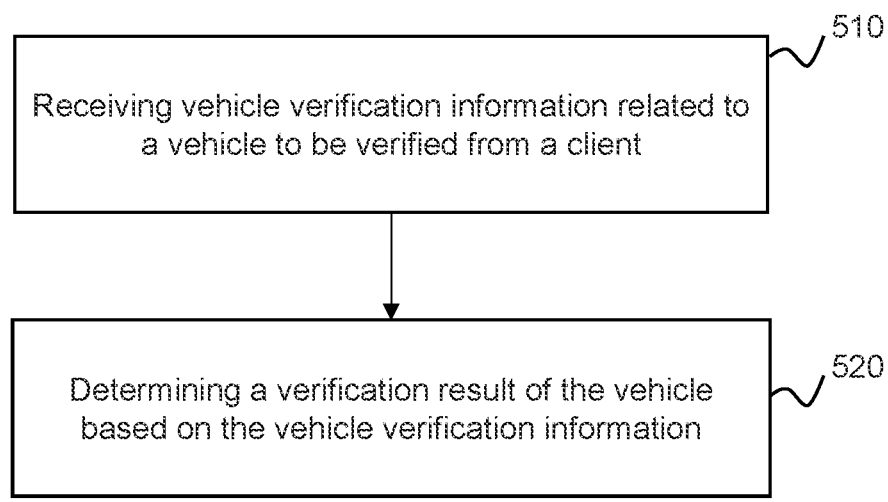
FIG. 5 is a flowchart illustrating an exemplary process for vehicle verification according to some embodiments of the present disclosure.

FIG. 5 is a flowchart illustrating an exemplary process for vehicle verification according to some embodiments of the present disclosure. In some embodiments, process 500 may be performed by a processing device (e.g., the server 110). For example, the process 500 may be stored in a storage device (e.g., the storage device 130 or a storage unit of the processing device) in a form of programs or instructions. When the processor 220 or the module shown in FIG. 4 executes the programs or the instructions, the process 500 may be implemented. In some embodiments, the process 500 may be accomplished with one or more additional operations not described and/or without one or more of the operations discussed. Additionally, the order in which the operations of the process 500 illustrated in FIG. 5 and described below is not intended to be limited.

In 510, vehicle verification information related to a vehicle to be verified may be received from a client. In some embodiments, the operation 510 may be performed by the receiving module 410.

In some embodiments, "to be verified" may indicate that information related to the vehicle needs to be verified in a specific scenario. For example, when a user (e.g., a driver) registers his vehicle on an online platform (e.g., an online car-hailing platform), registration information (e.g., a vehicle type, a color) related to the vehicle may be submitted, and the online platform may need to verify the accuracy of the registration information. Correspondingly, the online platform may receive the vehicle verification information (e.g., a vehicle image) from the client, and verify the accuracy of the registration information based on the vehicle verification information. In some embodiments, "to be verified" may also indicate that the information related to the vehicle needs to be verified in other scenarios (e.g., asset information verification of a user may be performed through a related platform), which is not limited in the present disclosure.

In some embodiments, the client may include a user terminal (e.g., the user terminal 140) related to the vehicle to be verified. For example, the client may include a mobile terminal (e.g., a mobile phone) held by an owner of the vehicle to be verified.

In some embodiments, the vehicle verification information may include image information, video information, audio information, or the like, or any combination thereof. For example, the vehicle verification information may include a video (or referred to as "verification video"). As another example, the vehicle verification information may include a plurality of images acquired continuously.

In some embodiments, the vehicle verification information may be acquired by the client via an imaging device. For example, the vehicle verification information may include a plurality of images acquired by the client via the imaging device. In some embodiments, the imaging device may include an image acquisition device (e.g., a camera), an audio acquisition device (e.g., a voice recorder), a video acquisition device (e.g., a video camera), or any device that can acquire relevant verification information. In some embodiments, the imaging device may be a portion of the client. For example, the imaging device may be a built-in camera of the client. In some embodiments, the imaging device may be an external device connected with the client.

In some embodiments, the vehicle verification information may be obtained in response to at least one vehicle verification instruction (e.g., an instruction sent by the server to the client). The vehicle verification instruction may be an instruction related to a vehicle verification action (also referred to as a "verification action"). In some embodiments, the vehicle verification action may include opening/closing a vehicle door, opening/closing a vehicle window, opening/closing a trunk, opening/closing a sunroof, forward/backward of the vehicle, turning of the vehicle, turning on/off a light, or the like, or any combination thereof. Correspondingly, the at least one vehicle verification instruction may include an open/close instruction related to the vehicle door, an open/close instruction related to the vehicle window, an open/close instruction related to the trunk, an open/close instruction related to the sunroof, a vehicle forward/backward instruction, a vehicle turning instruction, a light on/off instruction, or the like, or any combination thereof. For example, the vehicle verification instruction may be an instruction to open a front left window. As another example, the vehicle verification instruction may be a combination of instructions for opening and closing the trunk, turning the vehicle, and turning on the light.

In some embodiments, the vehicle verification instruction may further include an instruction related to a user verification action. For example, the vehicle verification instruction may be an instruction of "please use your left hand to open the left front door." As another example, the vehicle verification instruction may be an instruction of "please place your right hand above the license plate of the vehicle."

Merely by way of example, the server may send a vehicle verification instruction to the client held by the user. After the client receives the vehicle verification instruction, the user may use the vehicle to be verified to perform a verification action indicated in the vehicle verification instruction, acquire a verification video or a plurality of verification images via the imaging device, and upload the verification video or the plurality of verification images to the server. More descriptions regarding the receiving the vehicle verification information from the client may be found elsewhere in the present disclosure, for example, FIG. 10 and relevant descriptions thereof, which may not be repeated herein.

In some embodiments, the processing device may randomly determine (e.g., randomly extract from a set of verification actions) one or more verification actions, and determine a corresponding vehicle verification instruction based on the one or more determined verification actions. The set of verification actions may be a set of preset verification actions of the vehicle, which may include but not limited be to the verification actions listed above. In some embodiments, the processing device may also divide the verification actions into a plurality of groups in advance, randomly extract one or more groups from the plurality of groups, and determine the corresponding vehicle verification instruction based on the one or more extracted sets of verification actions.

Merely by way of example, the processing device may assign unique serial numbers to four doors (including a front left door, a front right door, a rear left door, and a rear right door) of the vehicle, respectively, and assign serial numbers to verification actions corresponding to the four doors. The serial numbers may include letters, numbers, special symbols, or the like, or any combination thereof. For example, A, B, C, and D may be used to represent the left front door, right front door, left rear door, and right rear door, respectively. Number 0 may be used to represent opening the door and then closing the door, and number 1 may be used to represent opening the door. The processing device may randomly select a plurality of vehicle verification actions, including "open the front left door," "open and then close the front right door," "open and then close the rear right door," and "open the rear left door." Further, the processing device may determine a corresponding vehicle verification instruction as "A1B0D0C1" based on the numbering rule.

In some embodiments, the processing device may receive background information related to the vehicle from the client, generate the at least one vehicle verification instruction based on the background information, and send the at least one vehicle verification instruction to the client. In some embodiments, the background information may include geographic location information, time information, vehicle owner information, license plate information, or the like, or any combination thereof.

For example, when the processing device determines that a current location of the vehicle is a garage or a parking lot, the vehicle verification instruction "forward/backward of the vehicle" would not be suitable. The processing device may generate the open/close instruction related to the vehicle door, the open/close instruction related to a vehicle window, etc., as the vehicle verification instruction. As another example, when the processing device determines that a current time is daytime, and determines that a current location of the vehicle is in an open space such as a street based on vehicle location information, the light on/off instruction would not be suitable, and the processing device may generate the open/close instruction related to the vehicle door, the vehicle forward/backward instruction, etc., as the vehicle verification instruction. As still another example, when the processing device determines that an age of the owner of the vehicle is relatively old according to the vehicle owner information, to facilitate the vehicle owner to perform the corresponding verification action on the vehicle according to the vehicle verification instruction, complex instructions would not be suitable. The processing device may generate the open/close instruction related to the vehicle door as the vehicle verification instruction. As further another example, when the processing device determines that license plate numbers in the license plate information do not match license plate numbers in vehicle registration information, or the license plate information is an image and is blurred, the vehicle verification instruction generated by the processing device may include the open/close instruction related to the trunk, so as to further verify the license plate information of the vehicle to be verified.

In some embodiments of the present disclosure, the vehicle verification instruction may be generated based on the background information. Correspondingly, multi-dimensional information such as location information (e.g., the geographic location information), time information, vehicle owner information, license plate information, etc., may be comprehensively considered, and different vehicle verification instructions may be provided for different scenarios or different vehicle owner conditions, so that the vehicle verification process is more convenient, faster, and more efficient. In addition, a failure of the vehicle verification that the user can't perform the vehicle verification action due to conditions (e.g., the location of the vehicle is not suitable to perform a forward/backward action) may also be avoided.

The processing device may also generate the vehicle verification instruction in other ways, which are not limited in the present disclosure. After the vehicle verification instruction is generated based on the above ways, the processing device may send the vehicle verification instruction to the client, so that the user may perform the vehicle verification.

Figure 11:
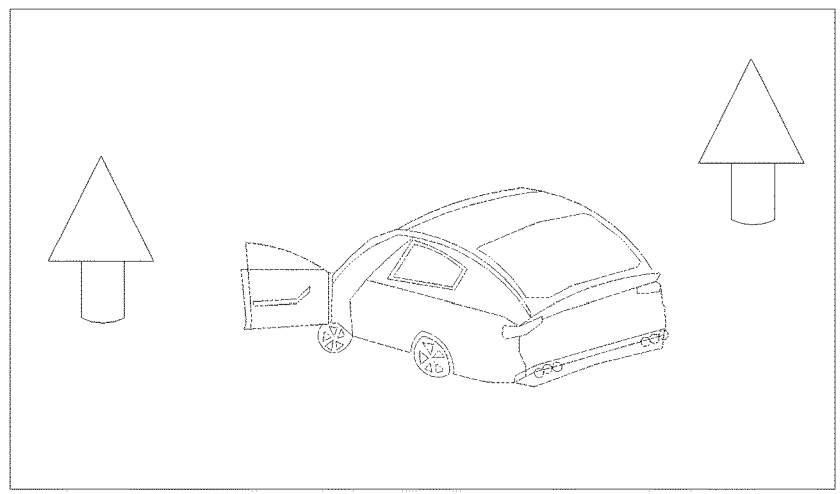
FIG. 11 is a schematic diagram illustrating an image in a verification video according to some embodiments of the present disclosure.
Figure 12:
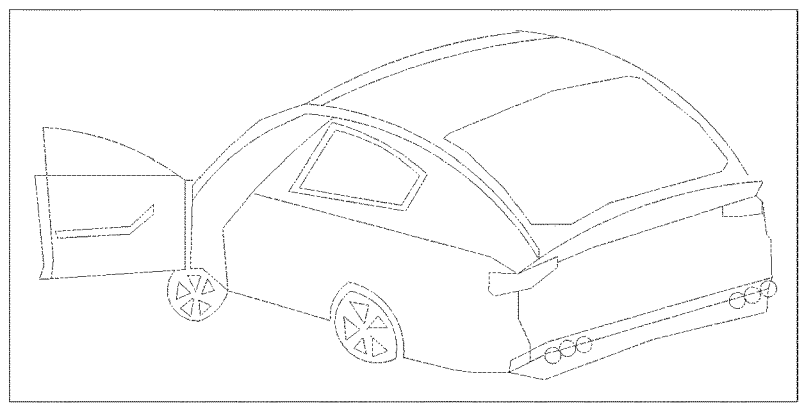
FIG. 12 is a schematic diagram illustrating an image in a pretreated verification video according to some embodiments of the present disclosure.

In some embodiments, after receiving the vehicle verification information from the client, the processing device may further process the vehicle verification information (or referred to as "pretreating"). For example, if the vehicle verification information received from the client includes a plurality of images, the processing device may perform content cropping, shake correction, resolution adjustment, etc., on the plurality of images. As another example, if the vehicle verification information received from the client includes a video, the processing device may perform bit rate adjustment, content cropping, format adjustment, resolution adjustment, etc., on the video. As still another example, if the vehicle verification information received from the client includes a plurality of images, the processing device may remove duplicate images from the plurality of images, and designate remaining images as target vehicle verification information. As still another example, if the vehicle verification information received from the client includes a video, the processing device may intercept a plurality of non-duplicate images from the video at a predetermined time interval (e.g., 0.5 seconds, 0.1 seconds, 0.2 seconds, 1 second), and designate the plurality of intercepted images as target vehicle verification information. As still another example, the processing device may remove images that are not clear (e.g., the resolution is lower than a preset threshold) in the vehicle verification information, and designate remaining images as target vehicle verification information. As further another example, as shown in FIG. 11 and FIG. 12, for each of the plurality of images, the processing device may extract (e.g., extract through a target extraction model) an image area corresponding to an area where the vehicle is located as a target image (to remove irrelevant interference factors).

In some embodiments, the pretreatment of the vehicle verification information may be performed via the client. For example, a processor (e.g., the CPU 340) of the client may pretreat the vehicle verification information, and send the processed vehicle verification information to the processing device (e.g., the server 110) through the network 150.

In 520, a verification result of the vehicle may be determined based on the vehicle verification information. In some embodiments, the operation 520 may be performed by the verification module 420.

In some embodiments, the verification result may include a verification pass or a verification failure. In some embodiments, the processing device may determine at least one vehicle action related to the vehicle to be verified based on the vehicle verification information, and determine whether the at least one vehicle action is consistent with the at least one vehicle verification instruction (or whether the at least one vehicle action is consistent with at least one vehicle verification action embodied by the at least one vehicle verification instruction) to determine the verification result of the vehicle. More descriptions regarding the determining the verification result of the vehicle may be found elsewhere in the present disclosure, for example, FIG. 6 and relevant descriptions thereof, which may not be repeated herein.

In some embodiments of the present disclosure, the verification result of the vehicle to be verified may be determined based on the vehicle verification instruction and the vehicle verification information in response to the vehicle verification instruction. That is, the vehicle verification is implemented based on an interaction between the vehicle and a platform, which can effectively avoid a condition that the user uploads false videos or images (e.g., pre-recorded videos or images of other vehicles, stitched images) but the platform can't distinguish the false videos or images and lead to false verification, thereby improving the accuracy of the vehicle verification. In addition, no further manual verification by business personnel is required, thereby improving the efficiency of the vehicle verification.

It should be noted that the description of each process above is merely for example and illustration, and not intended to limit the scope of the present disclosure. For those skilled in the art, various variations or modifications may be made under the teachings of the present disclosure. For example, the vehicle verification actions may not be limited to the ones listed above. The vehicle verification actions may also include turning on the light, turning on/off the light, opening/closing the sunroof, opening/closing the rear front window, opening/closing the trunk, etc. Any action related to components of the vehicle may be used as the vehicle verification action. As another example, the vehicle verification action may also include an action related to a sound, such as honking. Correspondingly, the vehicle verification information (e.g., the video or image) may further include sound information. However, those variations and modifications do not depart from the scope of the present disclosure.

Figure 6:
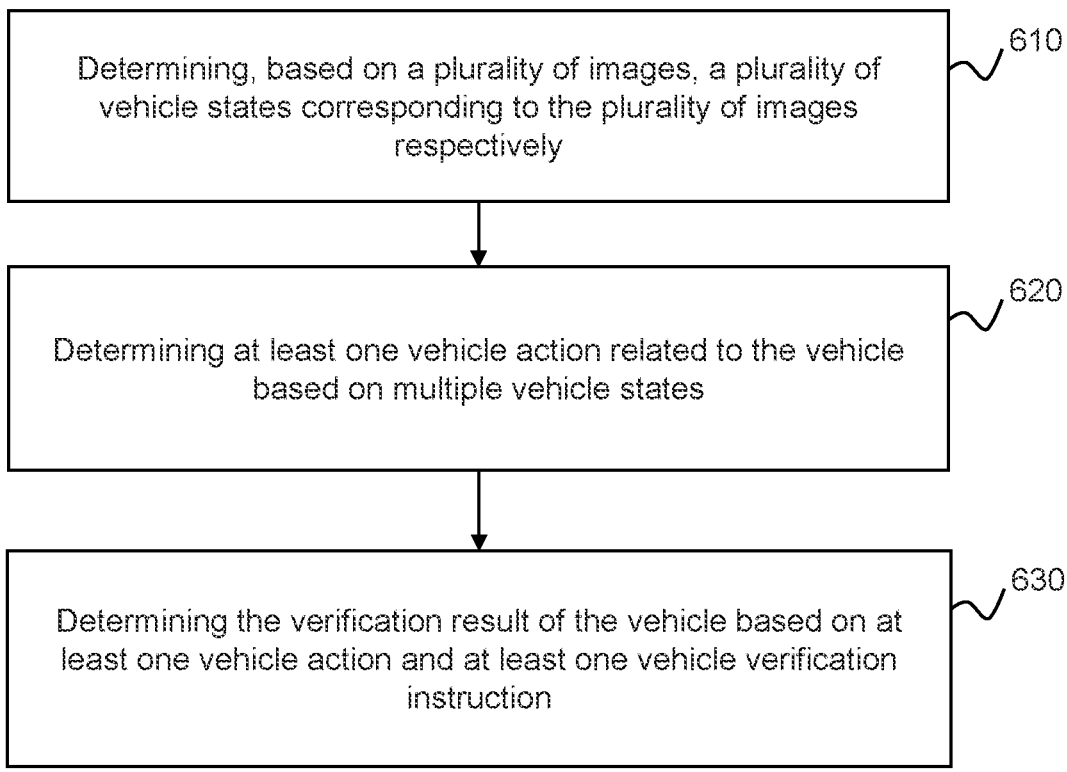
FIG. 6 is a flowchart illustrating an exemplary process for determining a verification result of a vehicle based on vehicle verification information according to some embodiments of the present disclosure.

FIG. 6 is a flowchart illustrating an exemplary process for determining a verification result of a vehicle based on vehicle verification information according to some embodiments of the present disclosure. In some embodiments, process 600 may be performed by a processing device (e.g., the server 110). For example, the process 600 may be stored in a storage device (e.g., the storage device 130 or a storage unit of the processing device) in a form of programs or instructions. When the processor 220 or the module shown in FIG. 4 executes the programs or the instructions, the process 600 may be implemented. In some embodiments, the process 600 may be accomplished with one or more additional operations not described and/or without one or more of the operations discussed. Additionally, the order in which the operations of the process 600 illustrated in FIG. 6 and described below is not intended to be limited.

In 610, a plurality of vehicle states corresponding to a plurality of images may be determined, respectively, based on the plurality of images. In some embodiments, the operation 610 may be performed by the verification module 420.

In some embodiments, the vehicle state may include a state of an entire vehicle or any component of the vehicle. In some embodiments, the vehicle state may include an open/close state of at least one vehicle door of the vehicle, an open/close state of at least one vehicle window of the vehicle, an open/close state of a trunk of the vehicle, an open/close state of a sunroof of the vehicle, position information of the vehicle, a light state of the vehicle, or the like, or any combination thereof. For example, the vehicle state may be that a front left door is in an open state and the trunk is in an open state. In some embodiments, the position information of the vehicle may include a location of the vehicle or any component (e.g., a front of the vehicle, vehicle doors, vehicle windows, a trunk of the vehicle, a sunroof of the vehicle, a light of the vehicle, a wheel of the vehicle) of the vehicle.

In some embodiments, the processing device may determine the plurality of vehicle states corresponding to the plurality of images, respectively, through a variety of ways (e.g., a machine learning model, a detection algorithm, a detection technique (e.g., a positioning technique)).

In some embodiments, the processing device may process the plurality of images by using a trained vehicle state recognition model so as to determine the plurality of vehicle states corresponding to the plurality of images, respectively. For example, for each of the plurality of images, the processing device may input the image into the vehicle state recognition model, and determine the vehicle state (e.g., an open/close state of a vehicle door) based on an output of the vehicle state recognition model. In some embodiments, the vehicle state recognition model may include a machine learning model (e.g., a convolutional neural network model, a deep neural network model). More descriptions regarding the determining the plurality of vehicle states corresponding to the plurality of images respectively based on the plurality of images may be found elsewhere in the present disclosure, for example, FIGS. 7A-7B and relevant descriptions thereof, which may not be repeated herein.

In 620, at least one vehicle action related to the vehicle may be determined based on the plurality of vehicle states.

In some embodiments, the operation 620 may be performed by the verification module 420.

The vehicle action may refer to an action of the entire vehicle or any component of the vehicle. In combination with the above descriptions, the vehicle verification information (e.g., the plurality of images) may be acquired in response to at least one vehicle verification instruction. Correspondingly, the at least one vehicle action embodied by the vehicle verification information (e.g., the plurality of images) may be an actual action made by the vehicle (or a component of the vehicle) in response to the at least one vehicle verification instruction (or at least one vehicle verification action embodied by the at least one vehicle verification instruction).

The processing device may determine the at least one vehicle action related to the vehicle, based on the plurality of vehicle states, through a variety of ways.

In some embodiments, the processing device may determine, based on the plurality of vehicle states, the at least one vehicle action related to the vehicle through a condition determination. For example, taking an action of "turn on the light" as an example, if a first vehicle state is a light off state, and a next adjacent vehicle state is a light on state, the processing device may determine that the vehicle action is "turn on the light."

In some embodiments, the processing device may determine, based on the plurality of vehicle states, the at least one vehicle action related to the vehicle through a finite state machine. The finite state machine may refer to a computing model that is implemented by a computing device to switch states based on conditions and then output the determination result. In some embodiments, the finite state machine may use a Moore machine, a Mealy machine, or other machines, which are not limited in the present disclosure. For instance, the processing device may input the plurality of vehicle states into the finite state machine, and the finite state machine may output the at least one vehicle action related to the vehicle after the plurality of vehicle states are processed by the finite state machine. For example, the plurality of vehicle states may include a plurality of open/close states of the vehicle door. The processing device may input the plurality of open/close states of the vehicle door into the finite state machine, and determine an action of the vehicle door based on the output of the finite state machine. More descriptions regarding the finite state machine may be found elsewhere in the present disclosure, for example, FIG. 8 and relevant descriptions thereof, which may not be repeated herein.

According to some embodiments of the present disclosure, the at least one vehicle action is determined by using the finite state machine, which can accurately and quickly determine the vehicle action when the vehicle verification instructions are complex and have an order of execution.

In 630, the verification result of the vehicle may be determined based on the at least one vehicle action and the at least one vehicle verification instruction. In some embodiments, the operation 630 may be performed by the verification module 420.

In some embodiments, the processing device may determine whether the at least one vehicle action is consistent with the at least one vehicle verification instruction. In response to that the at least one vehicle action is consistent with the at least one vehicle verification instruction, the processing device may determine that the verification result of the vehicle is passed. In response to that the at least one vehicle action is not consistent with the at least one vehicle verification instruction, the processing device may determine that the verification result of the vehicle is failure.

In some embodiments, the processing device may determine a similarity between the at least one vehicle action and the at least one vehicle verification instruction (or the at least one vehicle verification action embodied by the at least one vehicle verification instruction). If the similarity is higher than a preset threshold, the verification result of the vehicle may be determined to be passed. If the similarity is lower than or equal to the preset threshold, the verification result of the vehicle may be determined to be failure.

It should be noted that the description of each process above is merely for example and illustration, and not intended to limit the scope of the present disclosure. For those skilled in the art, various variations or modifications may be made under the teachings of the present disclosure. However, those variations and modifications do not depart from the scope of the present disclosure.

Figure 7A:
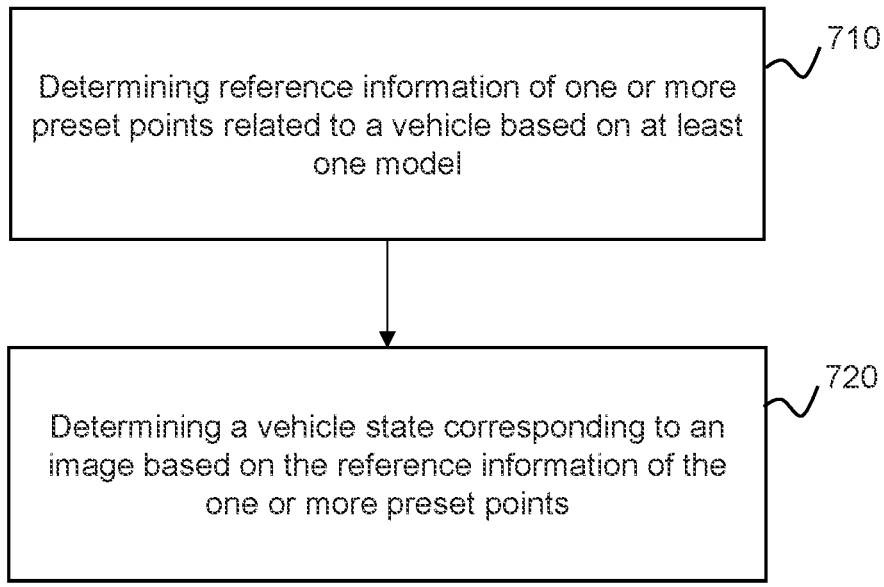
FIG. 7A is a flowchart illustrating an exemplary process for determining a plurality of vehicle states corresponding to a plurality of images respectively according to some embodiments of the present disclosure.

FIG. 7A is a flowchart illustrating an exemplary process for determining a plurality of vehicle states corresponding to a plurality of images respectively according to some embodiments of the present disclosure. In some embodiments, process 700 may be performed by a processing device (e.g., the server 110). For example, the process 700 may be stored in a storage device (e.g., the storage device 130 or a storage unit of the processing device) in a form of programs or instructions. When the processor 220 or the module shown in FIG. 4 executes the programs or the instructions, the process 700 may be implemented. In some embodiments, the process 700 may be accomplished with one or more additional operations not described and/or without one or more of the operations discussed. Additionally, the order in which the operations of the process 700 illustrated in FIG. 7A and described below is not intended to be limited.

In some embodiments, for each of the plurality of images, the processing device may determine a corresponding vehicle state, so as to obtain the plurality of vehicle states corresponding to the plurality of images respectively. Determining the vehicle state corresponding to one image may be taken as an example for illustration. It may be understood that the processing device may simultaneously or sequentially determine the plurality of vehicle states corresponding to the plurality of images, respectively, through a same or similar process.

In 710, reference information of one or more preset points related to a vehicle may be determined based on at least one model.

Figure 13:
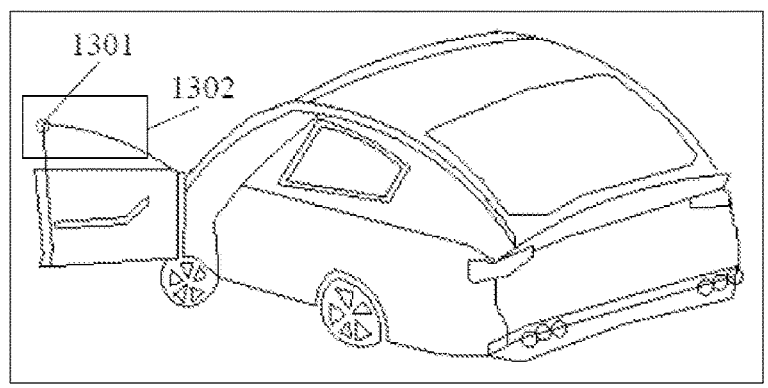
FIG. 13 is a schematic diagram illustrating a preset critical point and a preset region where the preset critical point is located according to some embodiments of the present disclosure.

In some embodiments, the preset point may be a point corresponding to any position of the vehicle. In some embodiments, the preset point may be a point corresponding to a landmark position on the vehicle. For example, the preset point may include a vertex of a vehicle door, a corner point (e.g., 1301 shown in FIG. 13) of the vehicle door, a corner point of a vehicle window, a center point of a vehicle light, a center point of a tire, a corner point of a vehicle front, a corner point of a trunk door, a center point of a sunroof, etc. In some embodiments, in combination with the description of the operation 510, different vehicle verification instructions may correspond to different preset points. For example, if a vehicle verification action embodied by the vehicle verification instruction is "open the vehicle door," the preset point may include a position point on the vehicle door (e.g., the corner point of the vehicle door). As another example, if the vehicle verification action embodied by the vehicle verification instruction is "turn on the light," the preset point may include the center point of the vehicle light.

As still another example, if the vehicle verification action embodied by the vehicle verification instruction is "open the vehicle window," the preset point may include the corner point of the vehicle window. As still another example, if the vehicle verification action embodied by the vehicle verification instruction is "turn the vehicle," the preset point may include the center point of the tire. As still another example, if the vehicle verification action embodied by the vehicle verification instruction is "forward the vehicle," the preset point may include the corner point of the vehicle front. As still another example, if the vehicle verification action embodied by the vehicle verification instruction is "open the sunroof," the preset point may include the center point of the sunroof.

In some embodiments, the reference information may include position information, brightness information, color information, etc., related to the preset point. For example, the reference information may include position information (e.g., position coordinates in a preset coordinate system, including an x-axis coordinate, a y-axis coordinate, a z-axis coordinate, etc.) of position points on the vehicle door, the vehicle window, the vehicle light, the vehicle sunroof, the vehicle front, the vehicle wheels, the trunk, etc. As another example, the reference information may include a color, a brightness, etc., near the center point of the vehicle light.

In some embodiments, the processing device may directly determine the reference information of the one or more preset points related to the vehicle based on a machine learning model. For example, in combination with the above description, if the vehicle verification action embodied by the vehicle verification instruction is "turn on the light," the preset point may include the center point of the vehicle light. Correspondingly, the processing device may directly determine the brightness information or the color information of the center point of the vehicle light based on the machine learning model. As another example, in combination with the above description, if the vehicle verification action embodied by the vehicle verification instruction is "open the vehicle door," the preset point may include the position point on the vehicle door (e.g., the corner point of the vehicle door). Correspondingly, the processing device may directly determine the position information of the position point on the vehicle door based on the machine learning model.

In some embodiments, the processing device may determine the reference information of the one or more preset points related to the vehicle based on a plurality of machine learning models. In some embodiments, the plurality of machine learning models may include a first model and a second model. In some embodiments, the first model or the second model may include a neural network model. The neural network model may include, but not be limited to, a deep neural network model, a convolutional neural network model, etc. In some embodiments, the first model and the second model may be independent models, or may be sub-models or sub-structures within a same model. The processing device may determine a preset area related to the one or more preset points based on the first model. Furthermore, the processing device may determine the reference information of the one or more preset points through the second model based on the preset area. For example, the processing device may extract an area where the vehicle light is located from an image based on an area extraction model, and obtain brightness information of the area by using a brightness detection model. As another example, the processing device may determine an area where the corner point of the vehicle door is located based on the area extraction model. Furthermore, the processing device may determine the position information of the corner point of the vehicle door through a position extraction model based on the area where the corner point of the vehicle door is located.

Designating the position point on the vehicle door (e.g., the corner point of the vehicle door) as the preset point is taken as an example for detailed description below. The preset point may include a preset key point and a preset reference point. As used herein, the preset reference point may be a position of the preset key point when the vehicle door is in a closed state. In some embodiments, the preset key point may be located at any position (e.g., 1301 shown in FIG. 13) on the vehicle door, which just needs to make sure that the positions of the preset key point are different when the vehicle door is in different states (e.g., open or closed). The processing device may input the image into the first model (e.g., a first-level CNN shown in FIG. 7B), and determine the preset area (e.g., 1302 shown in FIG. 13) where the preset key point corresponding to the vehicle door is located. Furthermore, the processing device may input the preset area into the second model (e.g., a second-level CNN shown in FIG. 7B), and determine position coordinates of the preset key point in the preset coordinate system (e.g., a coordinate system corresponding to the image). In some embodiments, the coordinate system corresponding to the image may be a system default, and may be adjusted according to different situations. For example, the coordinate system corresponding to the image may be a rectangular coordinate system with a lower left corner of the image as an origin, a bottom edge line of the image as a horizontal axis, and a left edge line of the image as a vertical axis.

In some embodiments, different vehicle components may correspond to different preset reference points. For example, when the preset key point is a point on the vehicle door, the preset reference point may be a position of the preset key point when the vehicle door is closed. As another example, when the preset key point is a point on the trunk, the preset reference point may be a position of the preset key point when the trunk is closed. In some embodiments, the preset reference point may also be set as a point at a fixed position on the image (e.g., a point at an upper left corner, a lower left corner, an upper right corner, or a lower right corner of the image).

In some embodiments of the present disclosure, a rough position (e.g., the preset area) of the preset point (e.g., the preset key point corresponding to the vehicle door) in the image may be recognized through the first model. Furthermore, the rough position may be input into the second model, and precise information (e.g., a precise position) of the preset point may be determined through the second model. That is, by determining the preset area through the first model, and then determining the precise position by analyzing the preset area through the second model, a size of the area that needs to be processed by the second model can be reduced, which reduces a computing amount and improves the efficiency and accuracy of the recognition.

In 720, the vehicle state corresponding to the image may be determined based on the reference information of the one or more preset points.

In some embodiments, in combination with the above description, if the reference information includes the color, the brightness, etc., near the center point of the vehicle light, the processing device may determine an on/off state of the vehicle light based on the reference information. For example, the processing device may determine whether a brightness value is greater than a preset threshold. In response to that the brightness value is greater than the preset threshold, the processing device may determine that the vehicle light is in the on state. In response to that the brightness value is less than or equal to the preset threshold, the processing device may determine that the vehicle light is in the off state.

In some embodiments, in combination with the above description, taking a certain vehicle door as an example, if the reference information includes the position information (e.g., the position coordinates) of the position points (e.g., the preset key point and the preset reference point) on the vehicle door, the processing device may determine a distance between the preset key point corresponding to the vehicle door and the preset reference point corresponding to the vehicle door based on the position information. If the distance is greater than a preset threshold, the processing device may determine that the vehicle door is in the open state. If the distance is less than or equal to the preset threshold, the processing device may determine that the vehicle door is in the off state. The processing device may determine an open/close state of other doors in a similar manner. Similarly, the processing device may also determine states of other components of the vehicle in a similar manner.

In some embodiments, the processing device may merge the states of the plurality of components of the vehicle to determine a final state of the vehicle.

It should be noted that the description of each process above is merely for example and illustration, and not intended to limit the scope of the present disclosure. For those skilled in the art, various variations or modifications may be made under the teachings of the present disclosure. For example, the preset point may not be limited to the ones listed in operation 710, and may also include a vertex of a rearview mirror, a vertex of the vehicle window, a center point of a bottom portion of the trunk, a vertex of a wiper, etc. However, those variations and modifications do not depart from the scope of the present disclosure.

Figure 7B:
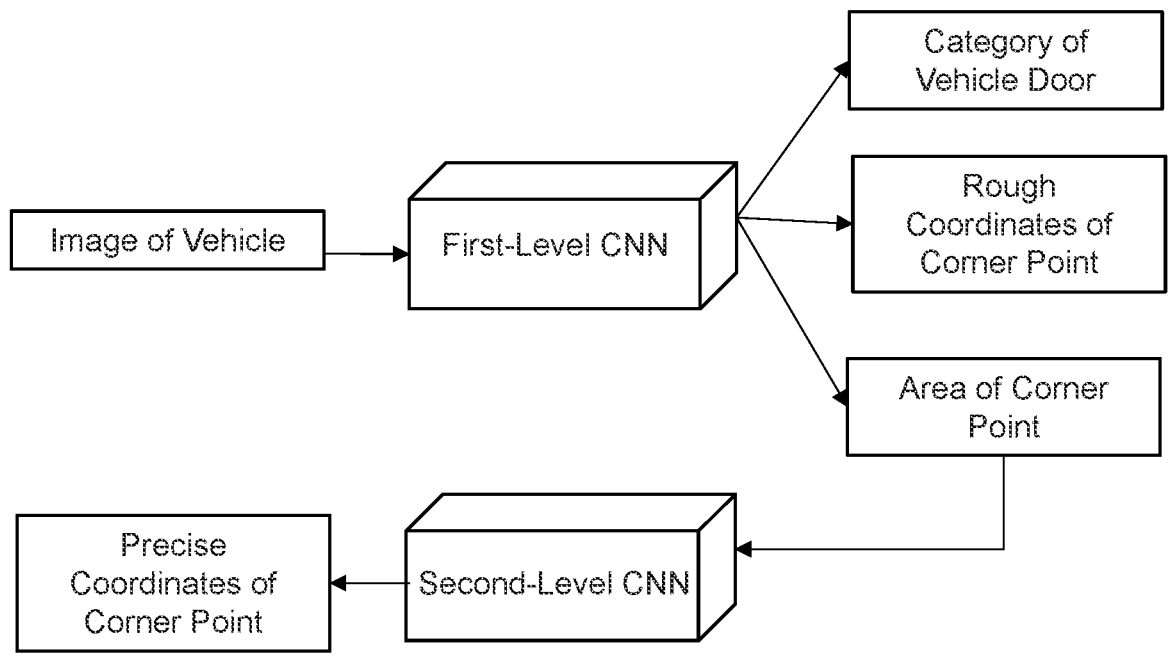
FIG. 7B is a schematic diagram illustrating an exemplary model structure according to some embodiments of the present disclosure.

FIG. 7B is a schematic diagram illustrating an exemplary model structure according to some embodiments of the present disclosure.

Referring to FIG. 7A, the processing device may determine reference information of one or more preset points related to a vehicle based on at least one model. In some embodiments, the at least one model may include one model including a plurality of sub-models or sub-structures. Alternatively, the at least one model may include a plurality of independent models. As shown in FIG. 7B, the at least one model may be a two-level cascaded convolutional neural network (CNN) model, wherein a first-level CNN model is a fully convolutional network (FCN) model, and a second-level CNN model is a convolutional neural network model. Determining a state of a vehicle door may be taken as an example to illustrate the use of the two-level cascaded convolutional neural network model. In the scenario, the at least one model may be referred to as a "position detection model."

In some embodiments, the processing device may input an image related to the vehicle into the first-level CNN model, and the first-level CNN model may output an area of a corner point of the vehicle door, rough coordinates of the corner point, and a category of the vehicle door. The corner point of the vehicle door may include an upper left corner of the vehicle door, a lower right corner of the vehicle door, etc. The area of the corner point of the vehicle door may be a preset area including the corner point of the vehicle door in the image. The category of the vehicle door may include a left front door, a left rear door, a right front door, a right rear door, etc. Further, the processing device may input the area of the corner point of the vehicle door output by the first-level CNN model into the second-level CNN model, and the second-level CNN model may output precise coordinates of the corner point.

In some embodiments, a plurality of images related to vehicles may be used as samples, and precise coordinates of corner points of vehicle doors in the plurality of images may be used as labels. A trained model may be obtained by using an end-to-end training manner. At the same time, precise coordinates of the corner points may also be added to assist in training the first-level CNN model, which may obtain a better detection performance by giving the first-level CNN model more supervision information.

According to some embodiments of the present disclosure, the two-level cascaded CNN model may be used to process the image related to the vehicle. The processing process may be from rough to fine. The first-level CNN model may be used to detect relatively rough information such as the category of the vehicle door, the area of the corner point, etc. The second-level CNN model may be used to detect the precise coordinates of the corner point of the vehicle door according to the area of the corner point, which can reduce a computing amount and determine the relatively precise coordinates of the corner point.

Figure 8:
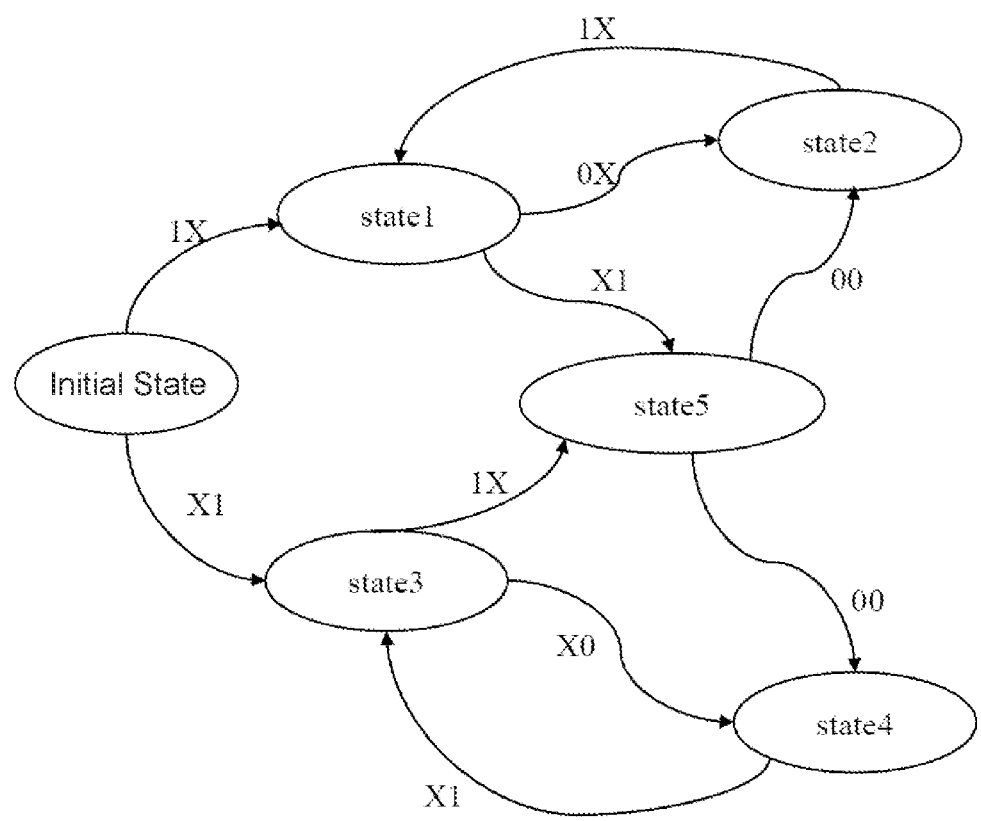
FIG. 8 is a schematic diagram illustrating determining at least one vehicle action related to a vehicle through a finite state machine according to some embodiments of the present disclosure.

FIG. 8 is a schematic diagram illustrating determining at least one vehicle action related to a vehicle through a finite state machine according to some embodiments of the present disclosure.

Referring to operation 620, the processing device may determine, based on a plurality of vehicle states, at least one vehicle action related to a vehicle through a finite state machine. The plurality of vehicle states including an open/close state of a vehicle door and an on/off state of a vehicle light may be taken as an example to illustrate the process of determining the vehicle action through the finite state machine. It should be understood that the vehicle state is not limited to the open/close state of the vehicle door and the on/off state of the vehicle light, and may also include vehicle states described elsewhere in the present disclosure, for example, an open/close state of a vehicle window, an open/close state of a trunk, an open/close state of a sunroof, position information of the vehicle, etc.

As shown in FIG. 8, an initial state is a state that the vehicle door is closed and the vehicle light is off. State 1 represents a state that the vehicle door is open and the vehicle light is off. State 2 represents a state that the vehicle door is closed and the vehicle light is off. State 3 represents a state that the vehicle door is closed and the vehicle light is on. State 4 represents a state that the vehicle door is closed and the vehicle light is off. State 5 represents a state that the vehicle door is open and the vehicle light is on. Two bits of binary data may be used to represent the vehicle action. A high bit represents a switch action of the vehicle door, wherein 1 represents open, 0 represents closed, and X represents unchanged. A low bit represents a switch action of the vehicle light, wherein 1 represents on, 0 represents off, and X represents unchanged. For example, 10 represents an action that the vehicle door is opened and the vehicle light is turned off, 11 represents an action that the vehicle door is opened and the vehicle light is turned on, 01 represents an action that the vehicle door is closed and the vehicle light is turned on, 00 represents an action that the vehicle door is closed and the vehicle light is turned off, X0 represents an action that the vehicle door is unchanged and the vehicle light is turned off, X1 represents an action that the vehicle door is unchanged and the vehicle light is turned on, 0X represents an action that the vehicle door is closed and the vehicle light is unchanged, 1X represents an action that the vehicle door is opened and the vehicle light is unchanged, and XX represents an action that the vehicle door is unchanged and the vehicle light is unchanged. X may be merely used to represent a component of the vehicle, without any vehicle action.

The processing device may determine, based on states of the vehicle door and states of the vehicle light corresponding to a plurality of images respectively, a group of vehicle actions corresponding to the plurality of images in a time series through the above finite state machine. For example, when the state of the vehicle changes from the initial state to the state 1, during which the state of the vehicle door changes from the closed state to the open state, and the state of the vehicle light is off (i.e., the state of the vehicle light remains unchanged), the finite state machine may output a vehicle action that the vehicle door is opened. As another example, when the state of the vehicle changes from the initial state to the state 3, during which the state of the vehicle light changes from the closed state to the open state, and the state of the vehicle door is closed (i.e., the state of the vehicle door remains unchanged), the finite state machine may output a vehicle action that the vehicle light is turned on. As still another example, when the state of the vehicle changes from the state 1 to the state 5, during which the state of the vehicle light changes from the off state to the on state, and the state of the vehicle door is opened (i.e., the state of the vehicle door remains unchanged), the finite state machine may output a vehicle action that the vehicle light is turned on.

It should be understood that when the state of the vehicle is not limited to two types, multi-bit binary data may be used to represent the vehicle action. Accordingly, the finite state machine may determine a plurality of vehicle actions.

Figure 9:
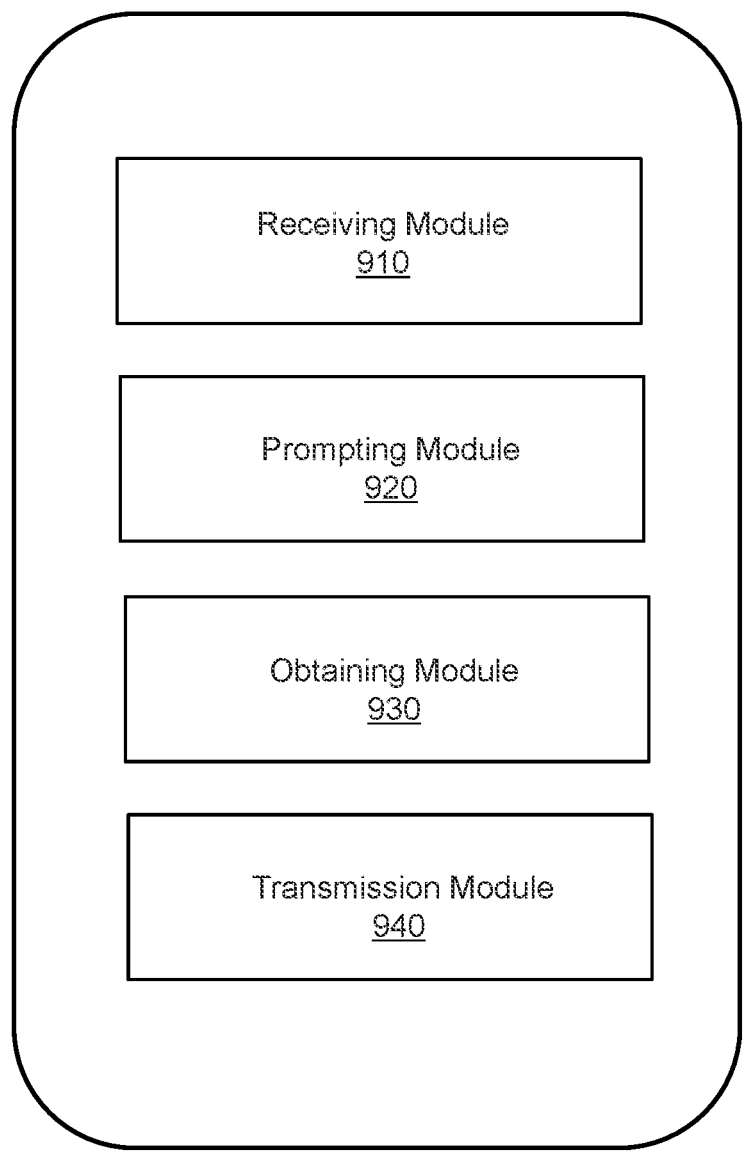
FIG. 9 is a block diagram illustrating an exemplary vehicle verification system according to some embodiments of the present disclosure.

FIG. 9 is a block diagram illustrating an exemplary vehicle verification system according to some embodiments of the present disclosure. In some embodiments, the vehicle verification system 900 may be implemented on a client (e.g., the user terminal 140). In some embodiments, the vehicle verification system 900 may be integrated or partially integrated in the user terminal 140.

As shown in FIG. 9, the vehicle verification system 900 may include a receiving module 910, a prompting module 920, an obtaining module 930, and a transmission module 940.

The receiving module 910 may receive at least one vehicle verification instruction from a server. More descriptions regarding the receiving the at least one vehicle verification instruction may be found elsewhere in the present disclosure, for example, operation 1010 and relevant descriptions thereof, which may not be repeated herein.

The prompting module 920 may send one or more verification action prompts to a user based on the vehicle verification instruction. In some embodiments, the at least one verification action prompt may include at least one of an open/close prompt related to a vehicle door, an open/close prompt related to a vehicle window, an open/close prompt related to a trunk, an open/close prompt related to a sunroof, a vehicle forward/backward prompt, or a light on/off prompt. In some embodiments, the at least one vehicle verification instruction may be related to background information related to a vehicle. The background information may include at least one of geographic location information, time information, vehicle owner information, or license plate information. More descriptions regarding the sending the one or more verification action prompts to the user may be found elsewhere in the present disclosure, for example, operation 1020 and relevant descriptions thereof, which may not be repeated herein.

The obtaining module 930 may obtain vehicle verification information related to a vehicle to be verified in response to the at least one verification action prompt. In some embodiments, the vehicle verification information may include a plurality of images acquired by a client via an imaging device. More descriptions regarding the obtaining the vehicle verification information related to the vehicle to be verified may be found elsewhere in the present disclosure, for example, operation 1030 and relevant descriptions thereof, which may not be repeated herein.

The transmission module 940 may transmit the vehicle verification information to a server, causing the server to determine a verification result of the vehicle based on the vehicle verification information. More descriptions regarding the transmitting the vehicle verification information to the server may be found elsewhere in the present disclosure, for example, operation 1040 and relevant descriptions thereof, which may not be repeated herein.

It should be noted that the system 900 and its modules illustrated in FIG. 9 may be implemented via various ways. For example, in some embodiments, the system 900 and its modules may be implemented through hardware, software, or a combination thereof. Herein, the hardware may be implemented by a dedicated logic; the software may be stored in the storage, the system 900 may be executed by proper instructions, for example, by a microprocessor or a dedicated design hardware. Those skilled in the art can understand that, the methods and systems described in the present disclosure may be implemented by the executable instructions of a computer and/or by control code in the processor, for example, the code supplied in a carrier medium such as a disk, a CD, a DVD-ROM, in a programmable storage such as a read-only memory (firmware), or in a data carrier such as optical signal carrier or electric signal carrier. The system 900 and its modules in the present disclosure may be implemented by a hardware circuit in a programmable hardware device in a ultra large scale integrated circuit, a gate array chip, a semiconductor such as a transistor, a field programmable gate array, a programmable logic device, a software performed by various processors, or a combination thereof (e.g., firmware).

It should be noted that the above descriptions of the vehicle verification system 900 and its modules are merely provided for illustration, and not intended to limit the scope of the present disclosure. Apparently, for those skilled in the art, after understanding the principle of the system 900, it is possible to arbitrarily combine various modules, or form a subsystem to connect with other modules without departing from this principle. For example, the receiving module 910 and the obtaining module 930 disclosed in FIG. 9 may be different modules in a system, or one module that can realize the functions of the two modules. As another example, modules in the vehicle verification system 900 may share a storage module. Alternatively, each module may also include an own storage module. Such deformations do not depart from the scope of the present disclosure.

Figure 10:
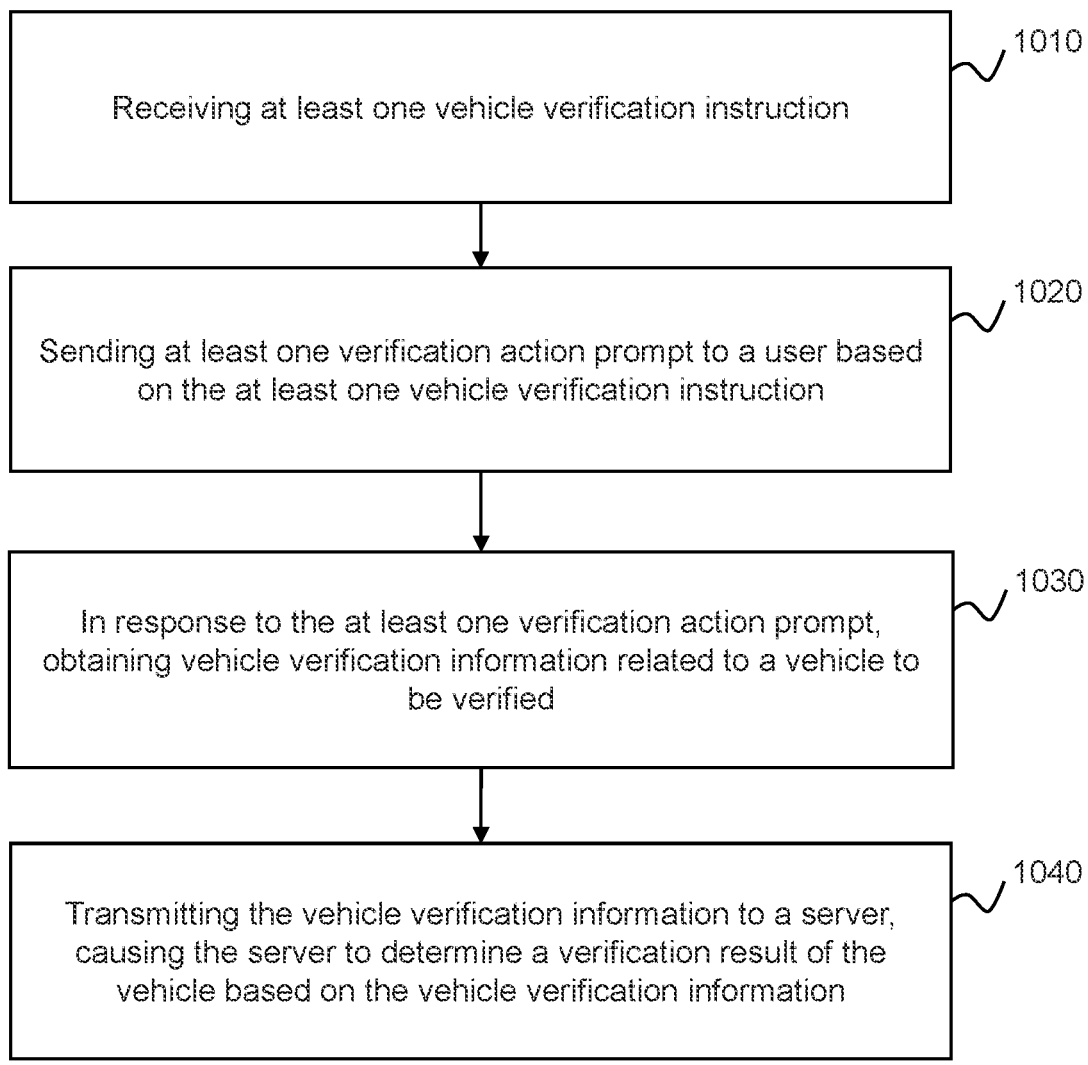
FIG. 10 is a flowchart illustrating an exemplary process for vehicle verification according to some embodiments of the present disclosure.

FIG. 10 is a flowchart illustrating an exemplary process for vehicle verification according to some embodiments of the present disclosure. In some embodiments, process 1000 may be performed by a processing device (e.g., the server 110). For example, the process 1000 may be stored in a storage device (e.g., the storage device 130 or a storage unit of the processing device) in a form of programs or instructions. When the CPU 340 or the module shown in FIG. 9 executes the programs or the instructions, the process 1000 may be implemented. In some embodiments, the process 1000 may be accomplished with one or more additional operations not described and/or without one or more of the operations discussed. Additionally, the order in which the operations of the process 1000 illustrated in FIG. 10 and described below is not intended to be limited.

In 1010, at least one vehicle verification instruction may be received. In some embodiments, the operation 1010 may be performed by the receiving module 910.

In some embodiments, as described in operation 510, the vehicle verification instruction may be an instruction related to a vehicle verification action (also be referred to as a "verification action"). More descriptions regarding the vehicle verification instruction and/or the vehicle verification action may be found elsewhere in the present disclosure, for example, FIG. 5 and relevant descriptions thereof, which may not be repeated herein.

In some embodiments, the vehicle verification instruction may further include an instruction related to a user verification action. For example, the vehicle verification instruction may be an instruction of "please use your left hand to open the left front door." As another example, the vehicle verification instruction may be an instruction of "please place your right hand above the license plate of the vehicle."

In some embodiments, a user terminal (e.g., the user terminal 140) may receive the at least one vehicle verification instruction sent by the server 110. In some embodiments, the user terminal may obtain the at least one vehicle verification instruction from the storage device 130.

In some embodiments, the at least one vehicle verification instruction may be related to background information related to a vehicle. In some embodiments, the background information may include geographic location information, time information, vehicle owner information, license plate information, or the like, or any combination thereof.

In some embodiments, before receiving the at least one vehicle verification instruction, the user terminal (e.g., the user terminal 140) may send at least one of the background information to the server 110. After the server 110 receives the background information related to the vehicle, the vehicle verification instruction may be generated based on the background information. For example, if a background display prompts that the vehicle is in an underground garage, the server may generate a vehicle verification instruction including a light switch since a shooting effect may be poor due to the light. More descriptions regarding the generating the vehicle verification instruction based on the background information may be found elsewhere in the present disclosure, for example, FIG. 5 and relevant descriptions thereof, which may not be repeated herein.

In 1020, at least one verification action prompt may be sent to a user based on the at least one vehicle verification instruction. In some embodiments, the operation 1020 may be performed by the prompting module 920.

The verification action prompt may be any form of prompt information that can be used to prompt the at least one vehicle verification action embodied by the at least one vehicle verification instruction to the user. In some embodiments, the at least one vehicle verification action may include opening/closing a vehicle door, opening/closing a vehicle window, opening/closing a trunk, opening/closing a sunroof, forward/backward of the vehicle, turning of the vehicle, turning on/off a light, or the like, or any combination thereof. Correspondingly, the at least one vehicle verification instruction may include an open/close instruction related to the vehicle door, an open/close instruction related to the vehicle window, an open/close instruction related to the trunk, an open/close instruction related to the sunroof, a vehicle forward/backward instruction, a vehicle turning instruction, a light on/off instruction, or the like, or any combination thereof.

In some embodiments, the at least one verification action prompt may include voice prompt information, image prompt information, text prompt information, or the like, or any combination thereof. That is, a form of the at least one verification action prompt may include a video form, a voice form, an image form, a text form, or the like, or any combination thereof. For example, the user terminal may broadcast a voice prompt message of "open the front left door" in a form of voice broadcast. As another example, the user terminal may display a text prompt message of "open the front left door" through a display interface. As still another example, the user terminal may broadcast a voice prompt message of "open the left front door" in a form of voice broadcast, and simultaneously display a text prompt message of "open the left front door" through a display interface. In some embodiments, the user terminal may display the at least one verification action prompt in various forms, such as highlighting, flashing, gradient, bold, italic, underline, color annotation, etc.

In some embodiments, the form of the at least one verification action prompt may be a system default, or may be adjusted according to different situations. In some embodiments, the form of the at least one verification action prompt may be selected and/or adjusted by the user.

In some embodiments, the form of the at least one verification action prompt may be related to the background information. In some embodiments, the user terminal may determine the form of the at least one verification action prompt based on the location information in the background information. For example, the user terminal may determine that a current location (e.g., a street) of the vehicle has a large sound decibel. In order to avoid the influence of noise in the environment, the user terminal may display the at least one verification action prompt in an image form, a text form, or a combination thereof.

In 1030, vehicle verification information related to a vehicle to be verified may be obtained in response to the at least one verification action prompt. In some embodiments, the operation 1030 may be performed by the obtaining module 930. More descriptions regarding the vehicle verification information may be found elsewhere in the present disclosure, for example, FIG. 5 and relevant descriptions thereof, which may not be repeated herein.

In some embodiments, after the user terminal sends the at least one verification action prompt (e.g., opening the left front door) to the user, the user may complete the action according to the at least one verification action prompt and acquire the vehicle verification information (e.g., a video or an image) through an imaging device, and then the user terminal may obtain the vehicle verification information from the imaging device.

In 1040, the vehicle verification information may be transmitted to a server, causing the server to determine a verification result of the vehicle based on the vehicle verification information. In some embodiments, the operation 1040 may be performed by the transmission module 940.

In some embodiments, after the user terminal obtains the vehicle verification information, the vehicle verification information may be pretreated. More descriptions regarding the pretreatment process may be found elsewhere in the present disclosure, for example, FIG. 5 and relevant descriptions thereof, which may not be repeated herein.

In some embodiments, the user terminal may upload the vehicle verification information to the server 110 via the network 150. After the server 110 receives the vehicle verification information, the verification result of the vehicle may be determined based on the vehicle verification information. In some embodiments, the verification result may include a verification pass or a verification failure. More descriptions regarding the determining the verification result of the vehicle by the server 110 may be found elsewhere in the present disclosure, for example, FIG. 5, FIG. 6, and relevant descriptions thereof, which may not be repeated herein.

In some embodiments, if the server 110 sends a verification result "failure" to the user terminal (e.g., the user terminal 140), the user terminal may request for re-verification. For example, the user may click a button or icon of "Re-verification" on the display interface of the user terminal to request the server to perform the re-verification. In some embodiments, the user terminal may perform the operation 1010 to the operation 1040 again for the re-verification.

In some embodiments, if the server 110 sends a verification result that the verification is passed to the user terminal (e.g., the user terminal 140), the user terminal (e.g., the user terminal 140) may end the vehicle verification process. For example, the user may click a button or icon of "Complete verification" on the display interface of the user terminal to end the vehicle verification process.

In some embodiments, during the vehicle verification process or if the verification result is failure, the user terminal may also cancel the vehicle verification process at any time. For example, the user may click a button or icon of "Cancel verification" on the display interface of the user terminal to cancel the vehicle verification.

It should be noted that the description of each process above is merely for example and illustration, and not intended to limit the scope of the present disclosure. For those skilled in the art, various variations or modifications may be made under the teachings of the present disclosure. However, those variations and modifications do not depart from the scope of the present disclosure.

Figure 14:
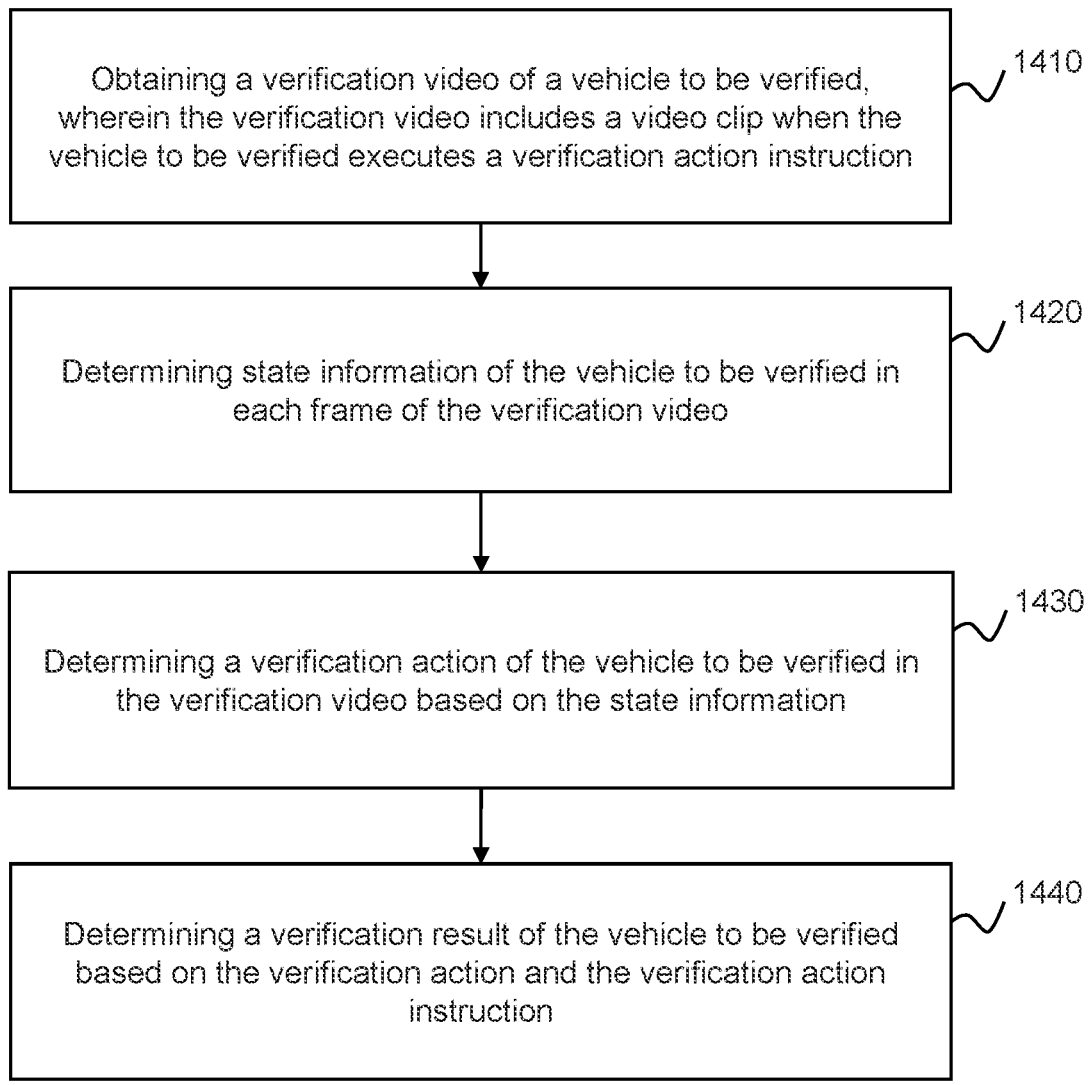
FIG. 14 is a flowchart illustrating an exemplary process for vehicle verification according to some embodiments of the present disclosure.

FIG. 14 is a flowchart illustrating an exemplary process for vehicle verification according to some embodiments of the present disclosure. In some embodiments, process 1400 may be performed by a processing device (e.g., the server 110). For example, the process 1400 may be stored in a storage device (e.g., the storage device 130 or a storage unit of the processing device) in a form of programs or instructions. When the processor 220 or the module shown in FIG. 16 executes the programs or the instructions, the process 1400 may be implemented. In some embodiments, the process 1400 may be accomplished with one or more additional operations not described and/or without one or more of the operations discussed. Additionally, the order in which the operations of the process 1400 illustrated in FIG. 14 and described below is not intended to be limited.

For convenience of description, the process 1400 may be described by using a verification video as vehicle verification information. Accordingly, in the embodiment, a "vehicle verification instruction" may also be referred to as a "verification action instruction," a "vehicle state" may also be referred to as "state information of a vehicle to be verified," and a "vehicle action" may also be referred to as a "verification action."

As shown in FIG. 14, the vehicle verification process provided by the embodiment of the present disclosure may include the following operations.

In 1410, a verification video of a vehicle to be verified may be obtained, wherein the verification video may include a video clip when the vehicle to be verified executes a verification action instruction.

In the operation 1410, a user may upload the verification video to a server through a smart terminal, such as a mobile terminal, a tablet computer, a computer, etc. The verification video may be a video clip about the vehicle held by the user. The server may verify whether the vehicle in the verification video is a real vehicle based on the verification video rather than a video of other vehicles recorded in advance before the verification video is acquired, or a verification video formed by merely splicing images.

For instance, when the verification video is acquired, the server may send a verification action instruction to the client held by the user. After receiving the verification action instruction, the user may perform a verification action indicated by the verification action instruction by using the vehicle to be verified, record a process of performing the verification action by a video device as the verification video, and upload the verification video to the server.

More descriptions regarding the verification action instruction may be found elsewhere in the present disclosure, for example, the "vehicle verification instruction" in FIG. 5 and relevant descriptions thereof, which may not be repeated herein.

In 1420, state information of the vehicle to be verified in each frame of the verification video may be determined.

In the operation 1420, the server may identify a state of the vehicle to be verified in each frame of the verification video. For instance, the state may be identified using a convolutional neural network model, etc.

More descriptions regarding the state information of the vehicle to be verified may be found elsewhere in the present disclosure, for example, the "vehicle state" in FIG. 5 and relevant descriptions thereof, which may not be repeated herein.

In 1430, a verification action of the vehicle to be verified in the verification video may be determined based on the state information.

In the operation 1430, after the server determines the state information of the vehicle to be verified, the verification action of the vehicle to be verified in the verification video may be determined according to the state of the vehicle to be verified in each frame of the verification video.

The verification action may be one verification action or a combination of multiple verification actions.

For example, if the state information of the vehicle to be verified is a close state of the front left door, an open state of the front left door, and an open state of the front left door in three consecutive frames of images in the verification video, the verification action of the verification vehicle may be "open the front left door."

In 1440, a verification result of the vehicle to be verified may be determined based on the verification action and the verification action instruction.

In the operation 1440, after determining the verification action of the vehicle to be verified in the verification video, the determined verification action may be compared with the verification action indicated by the verification action instruction. If a similarity between the two actions is higher than a preset threshold, or the two actions are completely consistent, the verification result of the vehicle to be verified may be determined to be passed. If the similarity between the two actions is lower than or equal to the preset threshold, the verification result of the vehicle to be verified may be determined to be failure.

For instance, if the verification action instruction is "control the vehicle to be verified to open the front left door, close the front left door, and turn on the left turn indicator," and the verification action of the vehicle to be verified is "open the front left door, open the front right door, close the front left door, close the front right door," the verification result of the vehicle to be verified may be determined to be failure.

In this way, the verification result of the vehicle to be verified may be determined based on the verification action and the verification action instruction, which can effectively avoid a situation that the user uploads an unreal vehicle verification video, accordingly, no manual verification by business personnel is needed, and the accuracy and efficiency of the verification can be improved.

Figure 15:
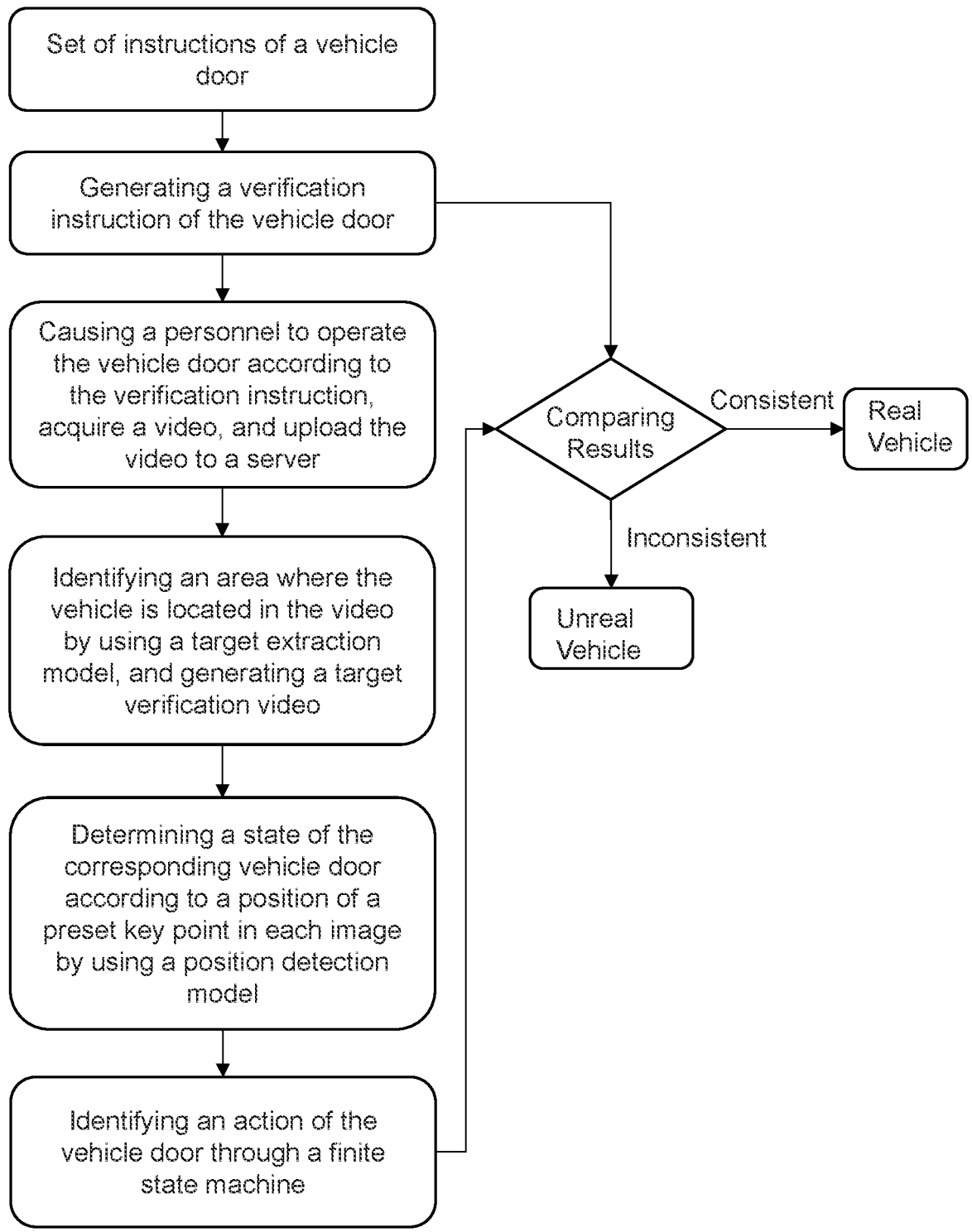
FIG. 15 is a flowchart illustrating an exemplary process for vehicle verification according to some embodiments of the present disclosure.

FIG. 15 is a flowchart illustrating an exemplary process for vehicle verification according to some embodiments of the present disclosure. In some embodiments, process 1500 may be performed by a processing device (e.g., the server 110). For example, the process 1500 may be stored in a storage device (e.g., the storage device 130 or a storage unit of the processing device) in a form of programs or instructions. When the processor 220 or the module shown in FIG. 16 executes the programs or the instructions, the process 1500 may be implemented. In some embodiments, the process 1500 may be accomplished with one or more additional operations not described and/or without one or more of the operations discussed. Additionally, the order in which the operations of the process 1500 illustrated in FIG. 15 and described below is not intended to be limited.

For convenience of description, the process 1500 may be described by using an open/close instruction related to a vehicle door as a vehicle verification instruction. Accordingly, in the embodiment, the "vehicle verification instruction" may also be referred to as a "verification instruction of the vehicle door," and a "vehicle verification action" may also be referred to as a "verification action of the vehicle door." As shown in FIG. 15, the vehicle verification process provided by the embodiment of the present disclosure may include the following operations.

1) A set of instructions of the vehicle door may be generated. That is, possible verification instructions of the vehicle door may be generated.

2) A verification instruction of the vehicle door may be generated. That is, at least one verification instruction (which corresponds to at least one verification action of the vehicle door) of the vehicle door may be extracted from the set of instructions of the vehicle door.

3) The verification instruction of the vehicle door may be sent to a personnel for the vehicle verification to cause the personnel to operate the vehicle door according to the verification instruction, acquire a video, and upload the video to the server.

4) An area where the vehicle is located in the video may be identified by using a target extraction model, and a target verification video may be generated.

5) A position of a preset key point on each vehicle door of the vehicle to be verified in each image may be determined by using at least one model (e.g., a position detection model), and a state of the corresponding vehicle door may be determined according to the position of the preset key point.

6) The action (i.e., an actual action of the vehicle door) of the vehicle door may be identified through a finite state machine.

7) Whether the action of the vehicle door is consistent with the verification action in the instruction of the vehicle door may be determined. If the action of the vehicle door is consistent with the verification action in the instruction of the vehicle door, the verification result may be passed, and the vehicle to be verified may be determined to be a real vehicle. If the action of the vehicle door is inconsistent with the verification action in the instruction of the vehicle door, the verification result may be failure, and the vehicle to be verified may be determined to be an unreal vehicle.

Figure 16:
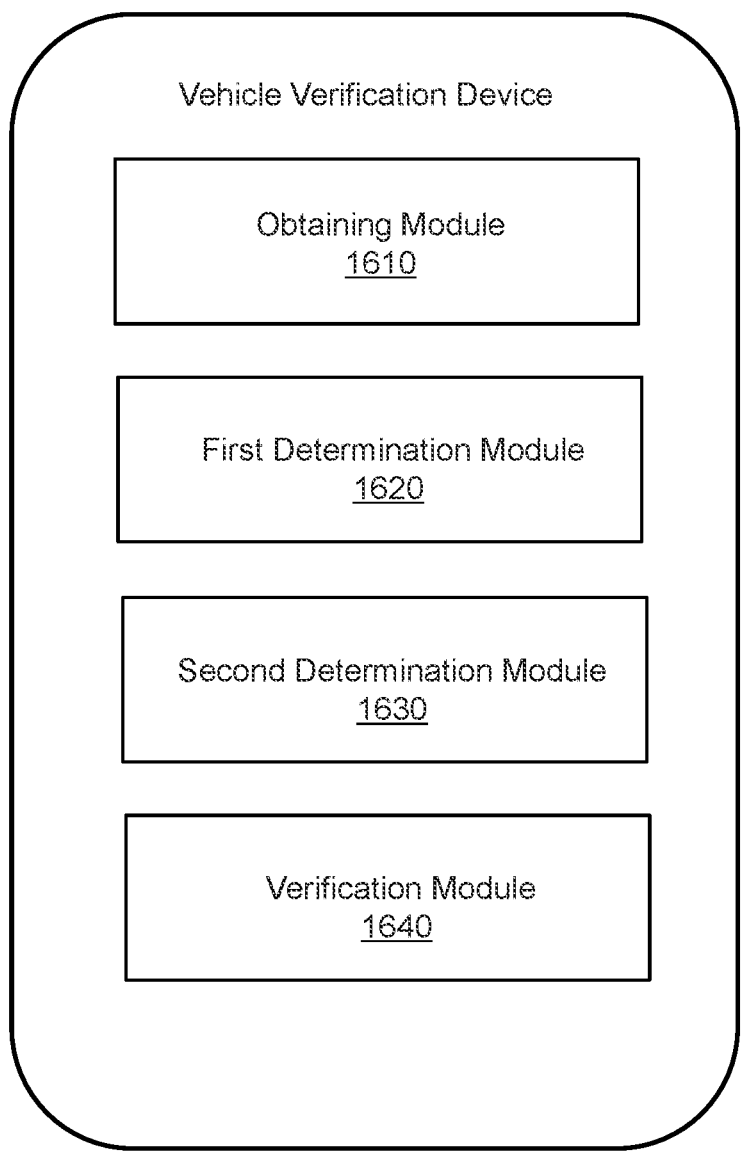
FIG. 16 is a block diagram illustrating a vehicle verification device according to some embodiments of the present disclosure.

FIG. 16 is a block diagram illustrating a vehicle verification device according to some embodiments of the present disclosure. In some embodiments, the vehicle verification device 1600 may be integrated or partially integrated in the vehicle verification system 400.

As shown in FIG. 16, the vehicle verification device 1600 may include an obtaining module 1610, a first determination module 1620, a second determination module 1630, and a verification module 1640.

The obtaining module 1610 may be configured to obtain a verification video of a vehicle to be verified, wherein the verification video includes a video clip when the vehicle to be verified executes a verification action instruction.

The first determination module 1620 may be configured to determine state information of the vehicle to be verified in each frame of the verification video.

The second determination module 1630 may be configured to determine a verification action of the vehicle to be verified in the verification video according to the state information.

The verification module 1640 may be configured to determine a verification result of the vehicle to be verified based on the verification action and the verification action instruction.

In some embodiments of the present disclosure, the verification action instruction may include at least one control instruction of the vehicle door.

Figure 17:
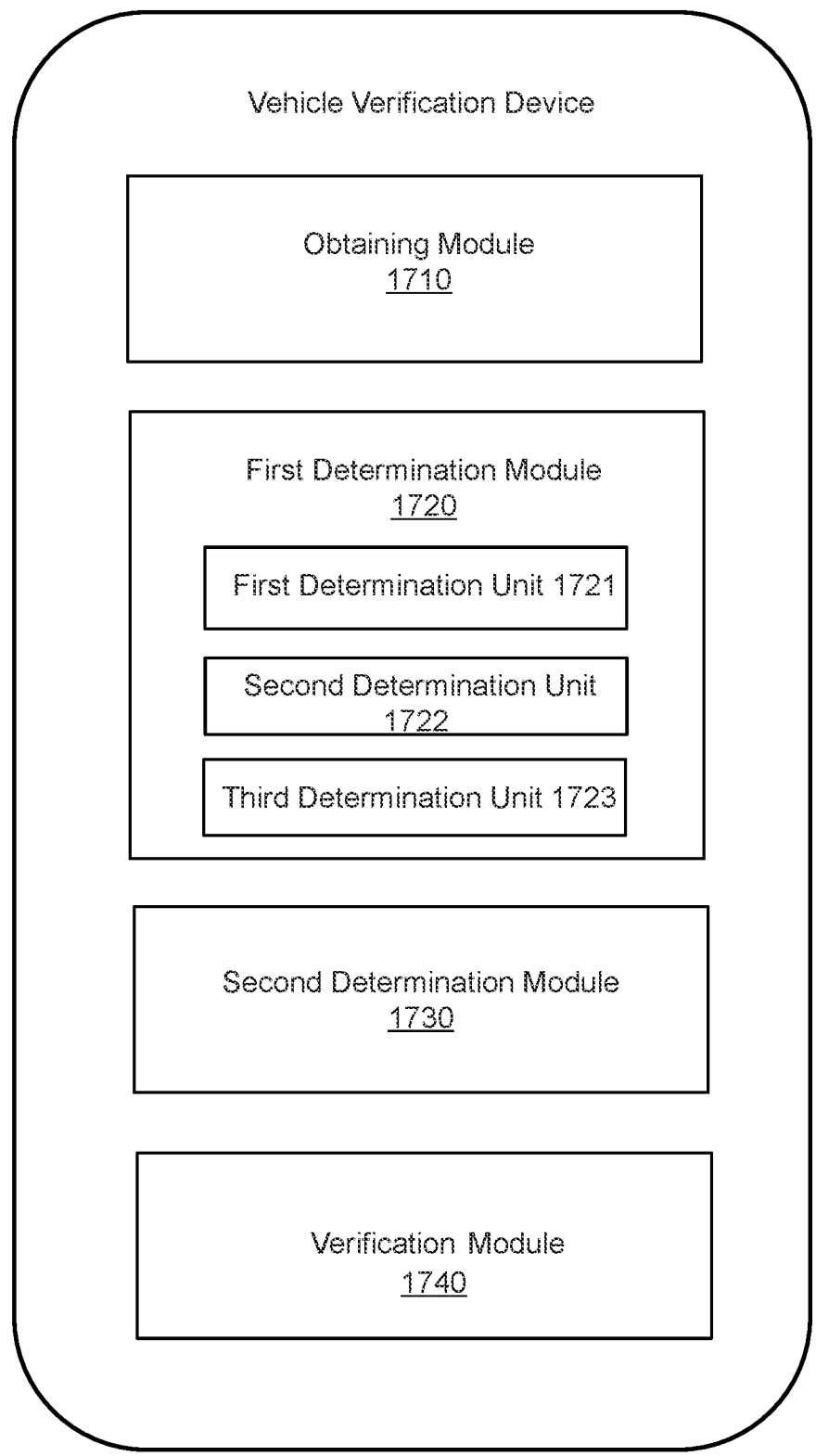
FIG. 17 is a schematic diagram illustrating a structure of a vehicle verification device according to some embodiments of the present disclosure.

FIG. 17 is a schematic diagram illustrating a structure of a vehicle verification device according to some embodiments of the present disclosure.

As shown in FIG. 17, in some embodiments of the present disclosure, the vehicle verification device 1700 may include an obtaining module 1710, a first determination module 1720, a second determination module 1730, and a verification module 1740. The first determination module 1720 may include a first determination unit 1721, a second determination unit 1722, and a third determination unit 1723.

The first determination unit 1721 may be configured to obtain a target verification video of a vehicle to be verified by extracting an image corresponding to an area where the vehicle to be verified is located from each frame of the verification video by using a trained target extraction model.

The second determination unit 1722 may be configured to determine a position of a preset key point corresponding to each vehicle door in each frame of the target verification video by using a trained position detection model.

The third determination unit 1723 may be configured to obtain state information of the vehicle to be verified by determining a state of each vehicle door of the vehicle to be verified in each frame of the target verification video according to the position of the preset key point.

In some embodiments of the present disclosure, the second determination module 1730 may be configured to determine a verification action of the vehicle to be verified in the verification video by using a finite state machine and the state of each vehicle door of the vehicle to be verified in each frame of the target verification video.

In some embodiments of the present disclosure, the verification module 1740 may be configured to determine whether the verification action is consistent with a target verification action indicated in a verification action instruction.

If the verification action is consistent with the target verification action, it may be determined that the vehicle to be verified passes the verification.

In some embodiments of the present disclosure, the second determination unit 1722 may be configured to input each frame of the target verification video into a first-level convolutional neural network model of the position detection model, and determine an image area corresponding to a preset area where the preset key point corresponding to each vehicle door of the vehicle to be verified is located in each frame of the target verification video.

Position coordinates of the preset key point corresponding to each vehicle door of the vehicle to be verified in a preset coordinate system may be determined by inputting the image area corresponding to the preset area where the preset key point corresponding to each vehicle door of the vehicle to be verified is located into a second-level convolutional neural network model of the position detection model.

In some embodiments of the present disclosure, the third determination unit 1723 may be configured to, for each vehicle door in each frame of the target verification video, determine a distance between the preset key point corresponding to the vehicle door and a preset reference point corresponding to the vehicle door based on the position coordinates of the preset key point corresponding to the vehicle door in the preset coordinate system and coordinates of the preset reference point corresponding to the vehicle door.

The state of the vehicle door in the frame image may be determined based on the distance between the preset key point corresponding to the vehicle door and the preset reference point corresponding to the vehicle door.

The possible beneficial effects of the embodiments of the present disclosure may include but not limited to the following. (1) By comparing an actual vehicle action corresponding to vehicle verification information with a vehicle verification action embodied by a vehicle verification instruction, vehicle verification can be automated without human involvement, which can improve the verification efficiency of vehicle authenticity. (2) By determining reference information of a preset point through at least one model (e.g., the two-level convolutional neural network model), the preset point on the vehicle can be accurately determined and a vehicle state corresponding to an image can be accurately determined. (3) By determining a vehicle action related to the vehicle through a finite state machine, the vehicle action can be determined quickly and efficiently. It should be noted that different embodiments may have different beneficial effects. In different embodiments, the possible beneficial effects may be any one of the above effects, or any combination thereof, or any other beneficial effects that may be obtained.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer-readable program code embodied thereon.

A non-transitory computer-readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python, or the like, conventional procedural programming languages, such as the "C" programming language, Visual Basic, Fortran, Perl, COBOL, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (e.g., through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method, implemented on a computing device including at least one processor and at least one storage medium, the at least one storage medium including a set of instructions for vehicle verification, the computing device being communicatively connected to a client related to a vehicle to be verified via a network, the method comprising:
   sending, to the client via the network, at least one vehicle verification instruction for instructing a user of the client to perform at least one verification action on the vehicle;
   receiving, from the client via the network, vehicle verification information related to the vehicle, wherein the vehicle verification information includes a plurality of images acquired by the client via an imaging device; and
   for each image of the plurality of images, determining reference information of one or more preset points related to the vehicle in the image by processing the image using at least one model, and determining a vehicle state corresponding to the image based on the reference information of the one or more preset points, the at least one model being trained machine learning model;
   determining, based on the plurality of vehicle states corresponding to the plurality of images, at least one vehicle action related to the vehicle; and determining a verification result indicating whether the vehicle is a real vehicle by determining whether the at least one vehicle action is consistent with the at least one verification action.

2. The method of claim 1, wherein the at least one vehicle verification instruction includes at least one of an open/close instruction related to a vehicle door, an open/close instruction related to a vehicle window, an open/close instruction related to a trunk, an open/close instruction related to a sunroof, a vehicle forward/backward instruction, a vehicle turning instruction, or a light on/off instruction.

3. The method of claim 1, wherein
   the at least one model includes a first model and a second model; and
   the determining, based on at least one model, reference information of one or more preset points related to the vehicle includes:
      determining, based on the first model, a preset area related to the one or more preset points; and
      determining, based on the preset area, the reference information of the one or more preset points through the second model.

4. The method of claim 1, wherein the vehicle state includes at least one of an open/close state of at least one vehicle door of the vehicle, an open/close state of at least one vehicle window of the vehicle, an open/close state of a trunk of the vehicle, an open/close state of a sunroof of the vehicle, position information of the vehicle, or a light state of the vehicle.

5. The method of claim 1, wherein the determining, based on the plurality of vehicle states, at least one vehicle action related to the vehicle includes:
   determining, based on the plurality of vehicle states, the at least one vehicle action related to the vehicle through a finite state machine, the finite state machine being a computing model that switches states based on conditions and outputs a determination result.

6. The method of claim 1, wherein the determining the verification result of the vehicle indicating whether the vehicle is a real vehicle includes:

determining whether the at least one vehicle action is consistent with the at least one verification action in the at least one vehicle verification instruction; and in response to that the at least one vehicle action is consistent with the at least one verification action, determining that the vehicle is a real vehicle and the verification result of the vehicle is passed.

7. The method of claim 1, wherein the method further includes:
receiving background information related to the vehicle from the client, the background information including at least one of geographic location information, time information, vehicle owner information, or license plate information; and
sending the at least one vehicle verification instruction to the client based on the background information.

8. The method of claim 1, wherein the at least one model includes a two-level cascaded convolutional neural network (CNN) model, the two-level CNN model includes a first-level CNN model and a second-level CNN model.

9. The method of claim 3, wherein the first model is a first-level CNN model, the second model is a second-level CNN model, the first-level CNN model and the second-level CNN model form a two-level cascaded convolutional neural network (CNN) model,
the preset area is determined by inputting the image into the first-level CNN model, and
the reference information of the one or more preset points includes positions of the one or more preset points that are determined by inputting the preset area into the second-level CNN model.

10. The method of claim 8, wherein the first-level CNN model is a fully convolutional network (FCN) model, and the second-level CNN model is a convolutional neural network model.

11. The method of claim 1, wherein the vehicle verification information received from the client includes a video, and the plurality of images are determined by:
intercepting a plurality of non-duplicate images from the video at a predetermined time interval; and
designating the plurality of intercepted images as the plurality of images.

12. The method of claim 1, wherein the at least one vehicle verification instruction is an open/close instruction related to a vehicle door, and the one or more preset points include landmark positions on the vehicle door.

13. A system, comprising a computing device being communicatively connected to a client related to a vehicle to be verified via a network, the computing device includes:
at least one storage medium including a set of instructions for vehicle verification;
at least one processor in communication with the at least one storage medium, wherein executing the set of instructions, the at least one processor is directed to perform operations including:
sending, to the client via the network, at least one vehicle verification instruction for instructing a user of the client to perform at least one verification action on the vehicle;
receiving, from the client via the network, vehicle verification information related to the vehicle, wherein the vehicle verification information includes a plurality of images acquired by the client via an imaging device; and
for each image of the plurality of images, determining reference information of one or more preset points related to the vehicle in the image by processing the image using at least one model, and determining a vehicle state corresponding to the image based on the reference information of the one or more preset points, the at least one model being trained machine learning model;
determining, based on the plurality of vehicle states corresponding to the plurality of images, at least one vehicle action related to the vehicle;
determining a verification result indicating whether the vehicle is a real vehicle by determining whether the at least one vehicle action is consistent with the at least one verification action.

14. The system of claim 13, wherein the at least one vehicle verification instruction includes at least one of an open/close instruction related to a vehicle door, an open/close instruction related to a vehicle window, an open/close instruction related to a trunk, an open/close instruction related to a sunroof, a vehicle forward/backward instruction, a vehicle turning instruction, or a light on/off instruction.

15. The system of claim 13, wherein
the at least one model includes a first model and a second model; and
the determining, based on at least one model, reference information of one or more preset points related to the vehicle includes:
determining, based on the first model, a preset area related to the one or more preset points; and
determining, based on the preset area, the reference information of the one or more preset points through the second model.

16. The system of claim 13, wherein the vehicle state includes at least one of an open/close state of at least one vehicle door of the vehicle, an open/close state of at least one vehicle window of the vehicle, an open/close state of a trunk of the vehicle, an open/close state of a sunroof of the vehicle, position information of the vehicle, or a light state of the vehicle.

17. The system of claim 13, wherein the determining, based on the plurality of vehicle states, at least one vehicle action related to the vehicle includes:
determining, based on the plurality of vehicle states, the at least one vehicle action related to the vehicle through a finite state machine, the finite state machine being a computing model that switches states based on conditions and outputs a determination result.

18. The system of claim 13, wherein the determining the verification result of the vehicle indicating whether the vehicle is a real vehicle includes:
determining whether the at least one vehicle action is consistent with the at least one verification action in the at least one vehicle verification instruction; and
in response to that the at least one vehicle action is consistent with the at least one verification action, determining that the vehicle is a real vehicle and the verification result of the vehicle is passed.

19. The system of claim 13, wherein the operations further include:
receiving background information related to the vehicle from the client, the background information including at least one of geographic location information, time information, vehicle owner information, or license plate information; and
sending the at least one vehicle verification instruction to the client based on the background information.

20. A method implemented on a client related to a vehicle to be verified, the client including at least one processor and at least one storage medium, the at least one storage medium including a set of instructions for vehicle verification, the client being communicatively connected to a server via a network, the method comprising:

receiving, from the server via the network, at least one vehicle verification instruction for instructing a user of the client to perform at least one verification action on the vehicle;

sending at least one verification action prompt to the user based on the at least one vehicle verification instruction;

in response to the at least one verification action prompt, obtaining vehicle verification information related to a vehicle to be verified, wherein the vehicle verification information includes a plurality of images acquired by the client via an imaging device; and transmitting the vehicle verification information to the server, causing the server to determine a verification result of the vehicle based on the vehicle verification information by:

for each image of the plurality of images, determining reference information of one or more preset points related to the vehicle in the image by processing the image using at least one model, and determining a vehicle state corresponding to the image based on the reference information of the one or more preset points, the at least one model being trained machine learning model;

determining, based on the plurality of vehicle states corresponding to the plurality of images, at least one vehicle action related to the vehicle; and determining the verification result indicating whether the vehicle is a real vehicle by determining whether the at least one vehicle action is consistent with the at least one verification action.

* * * * *